United States Patent
Oh et al.

(10) Patent No.: US 10,123,079 B2
(45) Date of Patent: Nov. 6, 2018

(54) METHOD AND APPARATUS FOR TRANSMITTING/RECEIVING BROADCAST SIGNAL IN HYBRID BROADCASTING SYSTEM

(71) Applicant: LG ELECTRONICS INC., Seoul (KR)

(72) Inventors: Sejin Oh, Seoul (KR); Kyoungsoo Moon, Seoul (KR); Woosuk Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 76 days.

(21) Appl. No.: 14/902,809

(22) PCT Filed: Jul. 14, 2014

(86) PCT No.: PCT/KR2014/006299
§ 371 (c)(1),
(2) Date: Jan. 4, 2016

(87) PCT Pub. No.: WO2015/008986
PCT Pub. Date: Jan. 22, 2015

(65) Prior Publication Data
US 2016/0173945 A1    Jun. 16, 2016

Related U.S. Application Data

(60) Provisional application No. 61/846,063, filed on Jul. 14, 2013.

(51) Int. Cl.
H04N 7/16       (2011.01)
H04N 21/462    (2011.01)
(Continued)

(52) U.S. Cl.
CPC ..... *H04N 21/4622* (2013.01); *H04N 21/2362* (2013.01); *H04N 21/2665* (2013.01);
(Continued)

(58) Field of Classification Search
CPC ....................................................... H04N 21/63
(Continued)

(56) References Cited

U.S. PATENT DOCUMENTS

2008/0066115 A1    3/2008  Burckard
2009/0086731 A1    4/2009  Lee et al.
(Continued)

FOREIGN PATENT DOCUMENTS

EP       2343881 A2      7/2011
JP       2007-329543 A   12/2007
(Continued)

OTHER PUBLICATIONS

Kornfeld et al., "DVB-H and IP Datacast-Broadcast to Handheld Devices," IEEE Transactions on Broadcasting, vol. 53, No. 1, Mar. 2007, pp. 161-170.

*Primary Examiner* — Michael Hong
(74) *Attorney, Agent, or Firm* — Birch, Stewart, Kolasch & Birch, LLP

(57) ABSTRACT

A receiver for processing a broadcast signal in a hybrid broadcasting system combining a broadcast network and a broadband network, according to one embodiment of the present invention, comprises a receiving unit for receiving a digital broadcast signal; a signal decoder for parsing FAC data or a common data unit included in the received broadcast signal and parsing network information from the FAC data or the common data; a service signaling channel processor for parsing a base data unit indicated by a base data unit identifier and parsing signaling data from the base (Continued)

data unit; and an audio/video processor for decoding broadcasting service using the signaling data.

10 Claims, 20 Drawing Sheets

(51) Int. Cl.
    *H04N 21/438*     (2011.01)
    *H04N 21/2362*     (2011.01)
    *H04N 21/2665*     (2011.01)
    *H04N 21/434*     (2011.01)
    *H04N 21/435*     (2011.01)
    *H04N 21/61*     (2011.01)
    *H04N 21/63*     (2011.01)
    *H04H 60/73*     (2008.01)

(52) U.S. Cl.
    CPC ......... *H04N 21/435* (2013.01); *H04N 21/438* (2013.01); *H04N 21/4345* (2013.01); *H04N 21/4382* (2013.01); *H04N 21/4384* (2013.01); *H04N 21/6125* (2013.01); *H04H 60/73* (2013.01); *H04N 21/63* (2013.01)

(58) Field of Classification Search
    USPC ......................................................... 725/135
    See application file for complete search history.

(56) References Cited

U.S. PATENT DOCUMENTS

2012/0327955 A1* 12/2012 Herrmann ............ H04N 21/235
                                                  370/476
2014/0029502 A1* 1/2014 Hong .................... H04L 69/16
                                                  370/312
2014/0229804 A1     8/2014 Hong et al.

FOREIGN PATENT DOCUMENTS

| | | |
|---|---|---|
| KR | 10-2009-0021115 A | 2/2009 |
| KR | 10-2011-0050334 A | 5/2011 |
| KR | 10-2013-0020879 A | 3/2013 |
| WO | WO 01/05158 A1 | 1/2001 |
| WO | WO 2011/142654 A2 | 11/2011 |

* cited by examiner

FIG. 5

| Syntax | No. of bits | Identifier |
|---|---|---|
| network_id | 16 | uimsbf |
| num_broadcast | 16 | uimsbf |
| for(i=0;i<num_broadcast-1;i++){ | | |
|    broadcast_id | 16 | uimsbf |
|    original_network_id | 16 | uimsbf |
|    delivery_system_descriptor_length | 16 | bslbf |
|    for(j=0;j<N;j++){ | | |
|       delivery_system_descriptor() | | |
|    } | | |
| } | | |

FIG. 6

| Syntax | No. of bits | Identifier |
|---|---|---|
| network_information_section(){ | | |
|    table_id | 8 | uimsbf |
|    section_syntax_indicator | 1 | bslbf |
|    reserved_future_use | 1 | bslbf |
|    reserved | 2 | bslbf |
|    section_length | 12 | uimsbf |
|    network_id | 16 | uimsbf |
|    reserved | 2 | bslbf |
|    version_number | 5 | uimsbf |
|    current_next_indicator | 1 | bslbf |
|    section_number | 8 | uimsbf |
|    last_section_number | 8 | uimsbf |
|    reserved_future_use | 4 | bslbf |
|    network_descriptors_length | 12 | uimsbf |
|    for(i=0;i<N;i++){ | | |
|      descriptor() | | |
|    } | | |
|    reserved_future_use | 4 | bslbf |
|    transport_stream_loop_length | 12 | uimsbf |
|    for(i=0;i< N;i ++){ | | |
|      broadcast_id | 16 | uimsbf |
|      original_network_id | 16 | uimsbf |
|      reserved_future_use | 4 | bslbf |
|      delivery_system_descriptor_length | 12 | uimsbf |
|      for(j=0;j< N;j ++){ | | |
|        delivery_system_descriptor() | | |
|      } | | |
|    } | | |
|    CRC_32 | 32 | rpchof |
| } | | |

FIG. 7

| Syntax | No. of bits | Identifier |
|---|---|---|
| delivery_system_descriptor(){ | | |
|   descriptor_tag | 16 | uimsbf |
|   descriptor_length | | |
|   delivery_system_id | 16 | uimsbf |
|   base_PLP_id | 8 | uimsbf |
|   if(descriptor_length> 3) | 16 | bslbf |
|   { | | |
|     delivery_system_parameters() | | |
|   } | | |
| } | | |

| Syntax | No. of bits | Identifier |
|---|---|---|
| delivery_descriptor(){ | | |
|   descriptor_tag | 16 | uimsbf |
|   descriptor_length | | |
|   delivery_system_id | 16 | uimsbf |
|   PLP_id | 8 | uimsbf |
|   PLP_profile | 8 | bslbf |
| } | | |

FIG. 12

| Syntax | No. of Bits | Format |
|---|---|---|
| service_map_table_section() { | | |
|     table_id | 8 | 0xDB |
|     section_syntax_indicator | 1 | '0' |
|     private_indicator | 1 | '1' |
|     reserved | 2 | '11' |
|     section_length | 12 | uimsbf |
|     table_id_extension{ | | |
|         SMT_protocol_version | 8 | uimsbf |
|         reserved | 8 | uimsbf |
|     } | | |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     num_services | 8 | uimsbf |
|     for (i=0; i<num_services; i++) | | |
|     { | | |
|         service_id | 16 | uimsbf |
|         reserved | 2 | '11' |
|         service_status | 2 | uimsbf |
|         SP_indicator | 1 | bslbf |
|         short_service_name_length/* m */ | 3 | uimsbf |
|         short_service_name | 16*m | bslbf |
|         reserved | 2 | '11' |
|         service_category | 6 | uimsbf |
|         reserved | 3 | '111' |
|         num_components | 5 | uimsbf |
|         IP_version_flag | 1 | bslbf |
|         service_source_IP_address_flag | 1 | bslbf |
|         service_destination_IP_address_flag | 1 | bslbf |

FIG. 13

| | | |
|---|---|---|
| if ( service_source_IP_address_flag) | | |
|     service_source_IP_address | 32 or 128 | uimsbf |
| if ( service_destination_IP_address_flag) | | |
|     service_destination_IP_address | 32 or 128 | uimsbf |
| for (j=0; j<num_components; j++) | | |
| { | | |
|     component_source_IP_address_flag | 1 | bsblf |
|     essential_component_indicator | 1 | bsblf |
|     component_destination_IP_address_flag | 1 | bslbf |
|     port_num_count | 5 | uimsbf |
|     component_destination_UDP_port_num | 16 | uimsbf |
|     if (component_source_IP_address_flag | | |
|         component_source_IP_address | 32 or 128 | uimsbf |
|     if ( component_destination_IP_address_flag) | | |
|         component_destination_IP_address | 32 or 128 | uimsbf |
|     reserved | 4 | '1111' |
|     num_component_level_descriptors | 4 | uimsbf |
|     for (k=0; k< num_component_level_descriptors; k++) | | |
|     { | | |
|         component_level_descriptor() | var | |
|     } | | |
| } | | |
| reserved | 4 | '1111' |
| num_service_level_descriptors | 4 | uimsbf |
| for (m=0; m< num_service_level_descriptors; m++) | | |
| { | | |
|     service_level_descriptor() | var | |
| } | | |
| } | | |
| } | | |

FIG. 14

| service_category | Meaning |
|---|---|
| 0x00 | The service category is not specified |
| 0x01 | Basic TV |
| 0x02 | Basic Radio |
| 0x03 | RI service ? Rights Issuer service |
| 0x04 | Not specified by the current version of this standard. |
| 0x05 | Not specified by the current version of this standard. |
| 0x06 | Not specified by the current version of this standard. |
| 0x07 | Not specified by the current version of this standard. |
| 0x08 | Service Guide ? Service Guide (Announcement ) |
| 0x09 | Emergency Alerting |
| 0x0A | Not specified by the current version of this standard. |
| 0x0B ~ 0xFF | Reserved for future use. |

FIG. 15

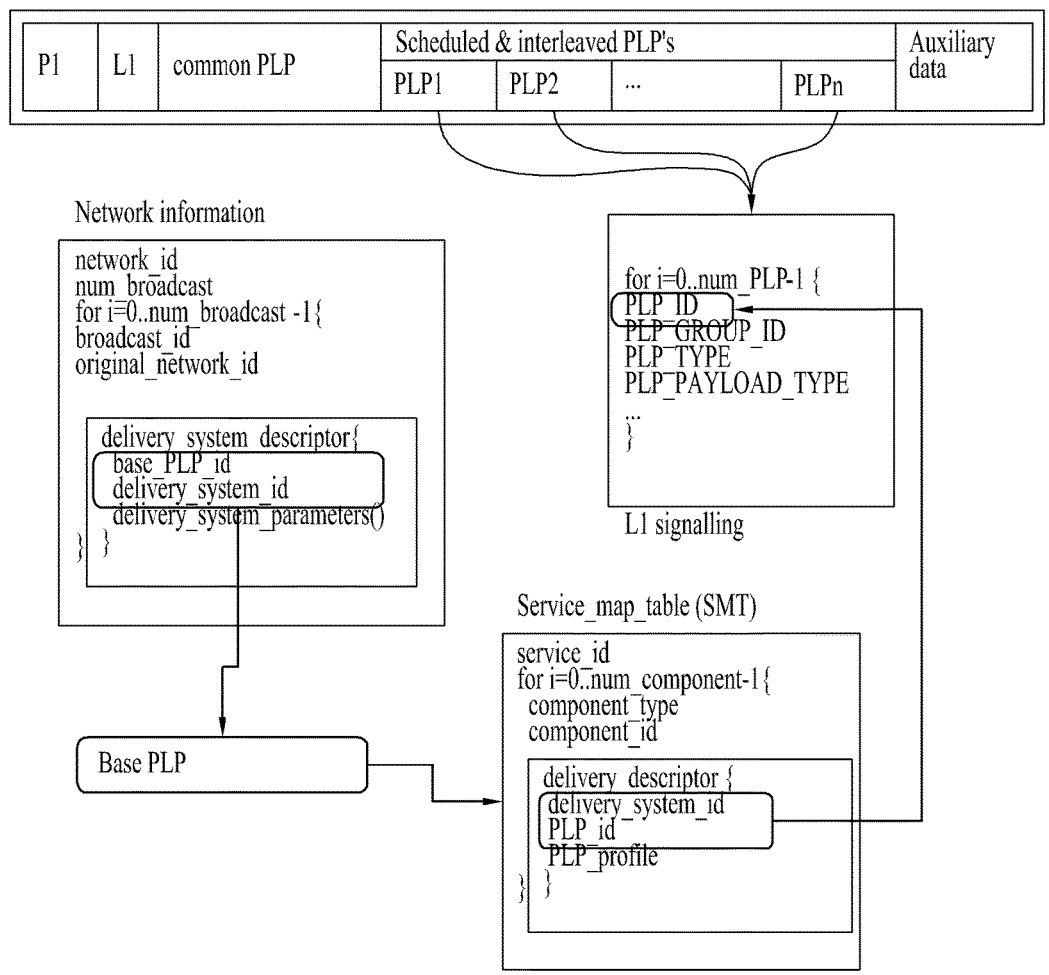

FIG. 19

| Syntax | No. of bits | Identifier |
|---|---|---|
| component_PLP_mapping(){ | | |
| num_PLP | 8 | uimsbf |
| for(i=0;i<num_PLP-1;i++){ | | |
|    delivery_system_id | 16 | uimsbf |
|    PLP_id | 8 | uimsbf |
|    PLP_profile | 8 | bslbf |
|    num_component | 8 | bslbf |
|    for(j=0;j<num_component-1;j++){ | | |
|       identifier _type | 8 | bslbf |
|       component_parameters(identifier_type) | | |
|    } | | |
| } | | |

FIG. 20

| Syntax | No. of bits | Identifier |
|---|---|---|
| component_paramters(){ | | |
|    reserved | 3 | '111' |
|    pid | 13 | uimsbf |
| } | | |

FIG. 21

| Syntax | No. of bits | Identifier |
|---|---|---|
| component_paramters(){ | | |
|     header_compression_type | 8 | uimsbf |
|     if(header_compression_type!=0){ | | |
|       context_profile | 8 | uimsbf |
|       context_id | 8 | uimsbf |
|       static_chain_length/*N*/ | 8 | bslbf |
|       if(static_chain_length>0) { | | |
|         static_chain_byte | 8*N | |
|       } | | |
|     } | | |
|     IP_version_flag | 1 | bslbf |
|     num_IP | 7 | bslbf |
|     for(i=0;i<num_IP-1;i++){ | | |
|       IP_address | 32 or 128 | uimsbf |
|       port_num | 16 | uimsbf |
|     } | | |
| } | | |

FIG. 22

| Syntax | No. of bits | Identifier |
|---|---|---|
| component_paramters(){ | | |
|   id | 16 | uimsbf |
| } | | |

METHOD AND APPARATUS FOR TRANSMITTING/RECEIVING BROADCAST SIGNAL IN HYBRID BROADCASTING SYSTEM

CROSS REFERENCE TO RELATED APPLICATIONS

This application is the National Phase of PCT International Application No. PCT/KR2014/006299, filed on Jul. 14, 2014, which claims priority under 35 U.S.C. 119(e) to U.S. Provisional Application No. 61/846,063, filed on Jul. 14, 2013, all of which are hereby expressly incorporated by reference into the present application.

TECHNICAL FIELD

The present invention relates to a method and apparatus for processing signaling data in a digital broadcasting system, and more particularly, to a method and apparatus for selectively extracting a data unit required for a specific broadcast service in a hybrid broadcasting system.

BACKGROUND ART

Transmission and reception of IP based broadcast signals have been increased in a digital broadcasting system. Particularly, importance of a transmission and reception environment of IP based broadcast signals has been highlighted in mobile digital broadcasting such as DVB-NGH of the European broadcasting standard and ATSC-MH of the North American broadcasting standard. Also, it is predicted that a hybrid broadcasting system will be constructed in a next generation broadcasting system, wherein the hybrid broadcasting system provides services by interworking a broadcast network with an Internet network.

It is difficult to use signaling of service information (SI) used in the conventional broadcasting system in a system where a broadcast network interworks with an Internet network, or it is required to correct signaling of the service information. However, as contents of signaling of broadcast service information have not been developed currently, a problem occurs in that broadcast services cannot be provided actively even though the hybrid broadcasting system is constructed.

DISCLOSURE

Technical Problem

An object of the present invention devised to solve the aforementioned problem is to provide a signaling system that supports efficient acquisition of services and contents in a next generation broadcasting system (for example, a combined broadcasting system of a broadcast network and an Internet network).

Technical Solution

To solve the aforementioned problem, according to one embodiment of the present invention, a receiver for processing a broadcast signal in a hybrid broadcasting system combining a broadcast network and a broadband network comprises a receiving unit for receiving a digital broadcast signal; a signaling decoder for parsing fast access channel (FAC) data or a common data unit included in the received broadcast signal and parsing network information from the FAC data or the common data, the network information including a base data unit identifier for identifying a base data unit that transmits signaling data within the broadcast signal; a service signaling channel processor for parsing a base data unit indicated by the base data unit identifier and parsing signaling data from the base data unit; and an audio/video processor for decoding a broadcasting service using the signaling data.

Preferably, the network information includes a delivery system descriptor, and the base data unit identifier is included in the delivery system descriptor.

Preferably, the signaling data includes a service map element that describes a broadcast service, and the service map element includes a delivery descriptor that includes information for connecting one or more components included in the broadcast service with a data unit of a physical layer.

Preferably, the service map element includes component address information that indicates address of the one or more components included in the broadcast service, and the delivery descriptor includes a data unit identifier for identifying a data unit that transmits the one or more components.

Preferably, the receiver further comprises a common protocol stack processor extracting the data unit indicated by the data unit identifier and parsing data for the one or more components from the extracted data unit to transmit the parsed data to the audio/video processor.

Preferably, the network information further includes a broadcasting station identifier for identifying a broadcasting station on the broadcast network.

Preferably, the delivery descriptor further includes a delivery system identifier for identifying the delivery system on the broadcast network; and data unit profile information for identifying a profile for which a component transmitted to the data unit identified by the data unit identifier is used.

Preferably, the FAC data includes information required by the physical layer to access a service, and the common data unit includes service information commonly applied to another data units.

A method for transmitting a broadcast signal of a hybrid broadcasting system combining a broadcast network and a broadband network according to one embodiment of the present invention comprises the steps of generating a data unit that includes a component for a broadcast service; generating a base data unit that includes signaling data; generating network information, the network information including a base data unit identifier for identifying the base data unit that transmits the signaling data within the broadcast signal; inserting the generated network information to FAC data or a common data unit; generating a broadcast signal that includes the data unit, the FAC data and the common data unit; and transmitting the generated broadcast signal.

Preferably, the network information includes a delivery system descriptor, and the base data unit identifier is included in the delivery system descriptor.

Preferably, the signaling data includes a service map element that describes a broadcast service, and the service map element includes a delivery descriptor that includes information for connecting one or more components included in the broadcast service with a data unit of a physical layer.

Preferably, the service map element includes component address information that indicates address of the one or more components included in the broadcast service, and the delivery descriptor includes a data unit identifier for identifying a data unit that transmits the one or more components.

Preferably, the network information further includes a broadcasting station identifier for identifying a broadcasting station on the broadcast network.

Preferably, the delivery descriptor further includes a delivery system identifier for identifying the delivery system on the broadcast network; and data unit profile information for identifying a profile for which a component transmitted to the data unit identified by the data unit identifier is used.

Preferably, the FAC data includes information required by the physical layer to access a service, and the common data unit includes service information commonly applied to another data units.

Advantageous Effects

According to the present invention, it is advantageous in that efficient signaling for information on a broadcast network is provided in a next generation broadcasting system.

According to the present invention, it is advantageous in that signaling for efficiently acquiring components of broadcast services and/or contents is provided in a next generation broadcasting system.

According to the present invention, efficient signaling for a relation between a component for supporting transmission of a component of a broadcast service and a certain data unit (for example, physical layer pipe (PLP)) is provided in a next generation broadcasting system.

BRIEF DESCRIPTION OF THE DRAWINGS

FIG. 5 is a diagram illustrating network information according to one embodiment of the present invention;

FIG. 6 is a diagram illustrating a network information table according to one embodiment of the present invention;

FIG. 7 is a diagram illustrating a delivery system descriptor (delivery_system_descriptor) according to one embodiment of the present invention;

FIG. 12 is a diagram illustrating a part of a service map table according to one embodiment of the present invention;

FIG. 13 is a diagram illustrating the other part of a service map table according to one embodiment of the present invention;

FIG. 14 is a diagram illustrating each field value of a service_category field of a service map table according to one embodiment of the present invention;

FIG. 15 is a diagram illustrating a procedure of acquiring PLP for transmitting a specific component within a broadcast signal according to one embodiment of the present invention;

FIG. 19 is a diagram illustrating component-PLP mapping information according to one embodiment of the present invention;

FIG. 20 is a diagram illustrating a component_parameters element according to one embodiment of the present invention when a value of an identifier_type element indicates that a component is encapsulated by MPEG-2 TS;

FIG. 21 is a diagram illustrating a component_parameters element according to one embodiment of the present invention when a value of an identifier_type element indicates that a component is identified by IP address and port number;

FIG. 22 is a diagram illustrating a component_parameters element according to one embodiment of the present invention when a value of an identifier_type element indicates that a component is identified using an ID value;

BEST MODE FOR CARRYING OUT THE INVENTION

Hereinafter, although the embodiments of the present invention will be described in detail with reference to the accompanying drawings and the disclosure described by the drawings, it is to be understood that the present invention is not limited by such embodiments.

Although the terms used in this specification are selected from generally known and used terms considering their functions in the present invention, the terms may be modified depending on intention of a person skilled in the art, practices, or the advent of new technology. Also, in special case, the terms mentioned in the description of the present invention may be selected by the applicant at his or her discretion, the detailed meanings of which are described in relevant parts of the description herein. Accordingly, the terms used herein should be understood not simply by the actual terms used but by the meaning lying within and the description disclosed herein.

In this specification, 'signaling' means that service information (SI) provided in a broadcasting system, an Internet broadcasting system and/or a broadcasting/Internet combined system is transmitted/received. The service information includes broadcast service information (for example, ATSC-SI and/or DVB-SI) provided in each broadcasting system which exists currently.

In this specification, a 'broadcast signal' is defined as a concept that includes a signal and/or data provided from bidirectional broadcasting such as Internet broadcasting, broadband broadcasting, communication broadcasting, data broadcasting and/or VOD (Video On Demand) in addition to terrestrial broadcasting, cable broadcasting, satellite broadcasting and/or mobile broadcasting.

In this specification, 'PLP' means a certain unit that transmits data belonging to a physical layer. Therefore, in this specification, the 'PLP' may be referred to as a 'data unit' or 'data pipe'.

An example of powerful applications which will be used in digital broadcast (DTV) service includes a hybrid broadcast service through interworking between a broadcast network and an Internet network. The hybrid broadcast service allows a user to experience various contents by transmitting enhancement data associated with broadcasting A/V (audio/video) contents transmitted through a terrestrial broadcast network or a part of the broadcasting A/V contents through the Internet network in real time.

Figure 1:
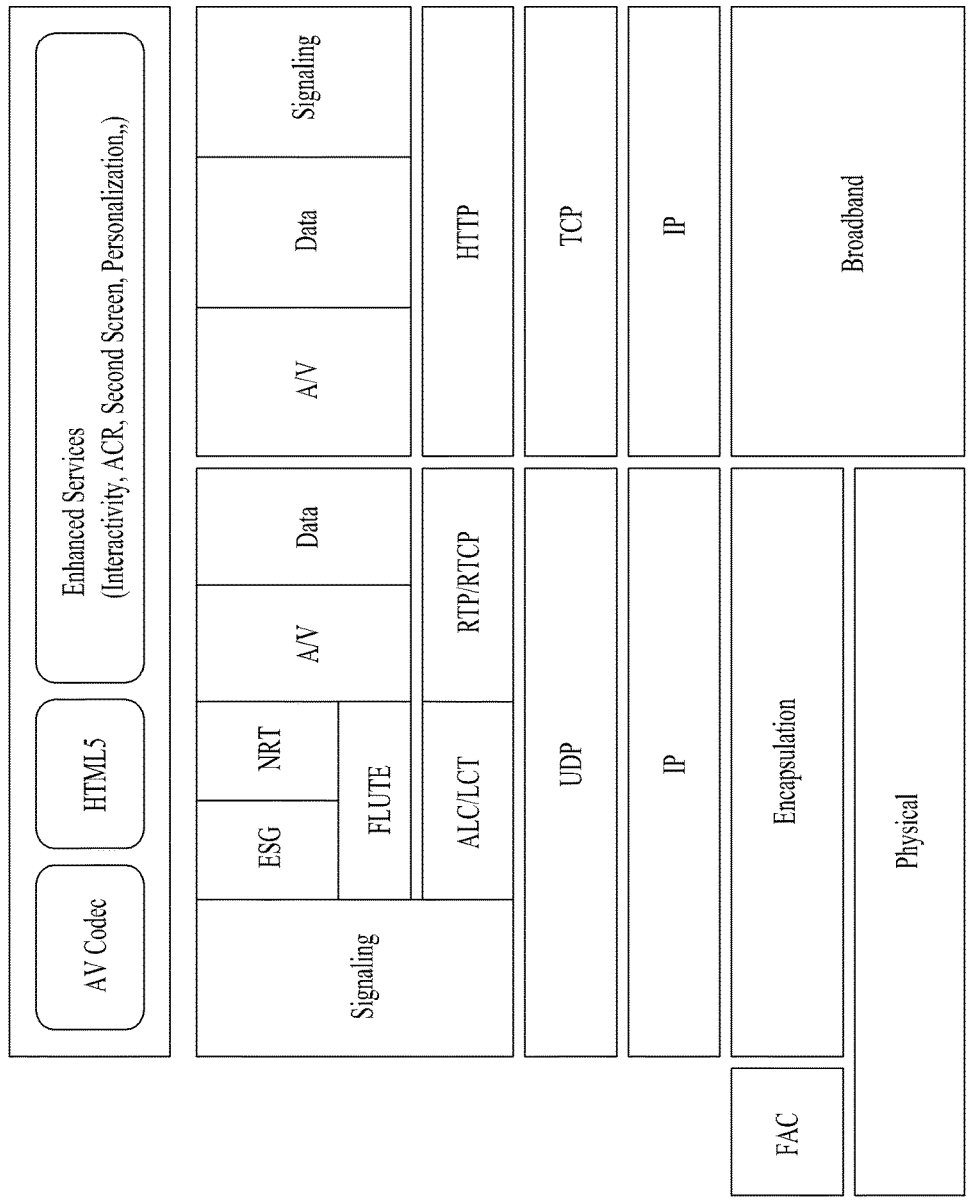
FIG. 1 is a diagram illustrating a protocol stack for a next generation broadcasting system according to one embodiment of the present invention.

FIG. 1 is a diagram illustrating a protocol stack for a next generation broadcasting system according to one embodiment of the present invention.

A broadcasting system according to the present invention may correspond to a hybrid broadcasting system where IP (Internet Protocol) centric broadcast network and a broadband are combined with each other.

The broadcasting system according to the present invention may be designed to maintain compatibility with a conventional MPEG-2 based broadcasting system.

The broadcasting system according to the present invention may correspond to a hybrid broadcasting system based on combination of an IP centric broadcast network, a broadband network and/or a mobile communication network (or cellular network).

Referring to FIG. 1, a physical protocol used in a broadcasting system such as an ATSC system and/or DVB system may be used as a physical layer. For example, in the physical layer according to the present invention, a transmitter/receiver transmits/receives a terrestrial broadcast signal and converts a transport frame, which includes broadcast data, to a proper type.

An encapsulation layer acquires IP datagram from the information acquired by the physical layer or acquires a specific frame (for example, RS frame, GSE-lite, GSE or signal frame). In this case, the frame may include a set of IP datagrams. For example, in the encapsulation layer, the transmitter includes data processed by the physical layer in the transport frame, or the receiver extracts MPEG-2 TS, IP datagram or specific frame from the transport frame acquired by the physical layer.

A transmission parameter channel (TPC) is a transmission parameter for transmitting mapping information between the physical layer and the IP datagram or frame.

A fast information channel (FIC) includes information (for example, mapping information between service ID and frame) for allowing fast access to service and/or contents. The FIC may be referred to as a fast access channel (FAC).

The broadcasting system according to the present invention may use protocols such as an Internet protocol (IP), a user datagram protocol (UDP), a transmission control protocol (TCP), an asynchronous layered coding/layered coding transport (ALC/LCT) protocol, a rate control protocol/RTP control protocol (RCP/RTCP), a hypertext transfer protocol (HTTP), a file delivery over unidirectional transport (FLUTE). A stack among these protocols may be understood with reference to the structure shown in FIG. 1.

In the broadcasting system according to the present invention, data may be transmitted in the form of ISO base media file format (ISOBMFF). An electrical service guide (ESG), a non-real time (NRT), A/V and/or general data may be transmitted in the form of ISOBMFF or general file.

Transmission of data according to a broadcast network may include transmission of a linear content and/or transmission of a non-linear content.

Transmission of RTP RTCP based A/V data (closed caption, emergency alert message, etc.) may correspond to transmission of a linear content. Meanwhile, A/V data or closed caption may be transmitted/received using the ALC/LCT protocol.

RTP payload may be transmitted in the form of RTP/AV stream that includes a network abstraction layer (NAL) and/or in the form of encapsulation of ISO based media file format. Transmission of RTP payload may correspond to transmission of a linear content. Transmission in the form of encapsulation of ISO based media file format may include MPEG DASH media segment for A/V.

Transmission of FLUTE based ESG, transmission of non-timed data, and transmission of NRT content may correspond to transmission of non-linear content. These FLUTE based ESG, non-timed data and NRT content may be transmitted in the form of MIME type file and/or in the form of encapsulation of ISO based media file format. Transmission in the form of encapsulation of ISO based media file format may include MPEG DASH media segment for A/V.

Transmission based on a broadband network may be categorized into transmission of contents and transmission of signaling data.

Transmission of contents includes transmission of a linear content (A/V, data (closed caption, emergency alert message, etc.)), transmission of a non-linear content (ESG, non-time data, etc.) and MPEG DASH based media segment (A/V, data) transmission.

Transmission of signaling data enables transmission that includes a signaling table (including MPD of MPEG DASH) transmitted from a broadcast network.

The broadcasting system of the present invention can support synchronization between linear and non-linear contents transmitted from the broadcast network or synchronization between contents transmitted through the broadcast network and contents transmitted through a broadband. For example, when one UD content is transmitted simultaneously through the broadcast network and the broadband, a receiver can adjust a timeline dependent on a transmission protocol and synchronize a content of the broadcast network with a content of the broadband to reconfigure one UD content.

An application layer of the broadcasting system according to the present invention can implement technical features such as interactivity, personalization, second screen and automatic content recognition (ACR). These features are important, for example, in extension from ATSC2.0, which is the north American broadcasting standard, to ATSC3.0. For example, HTML5 may be used for the feature of interactivity.

In a presentation layer of the broadcasting system according to the present invention, HTML and/or HTML5 may be used to identify a spatial and temporal relation between components or between interactive applications.

Figure 2:
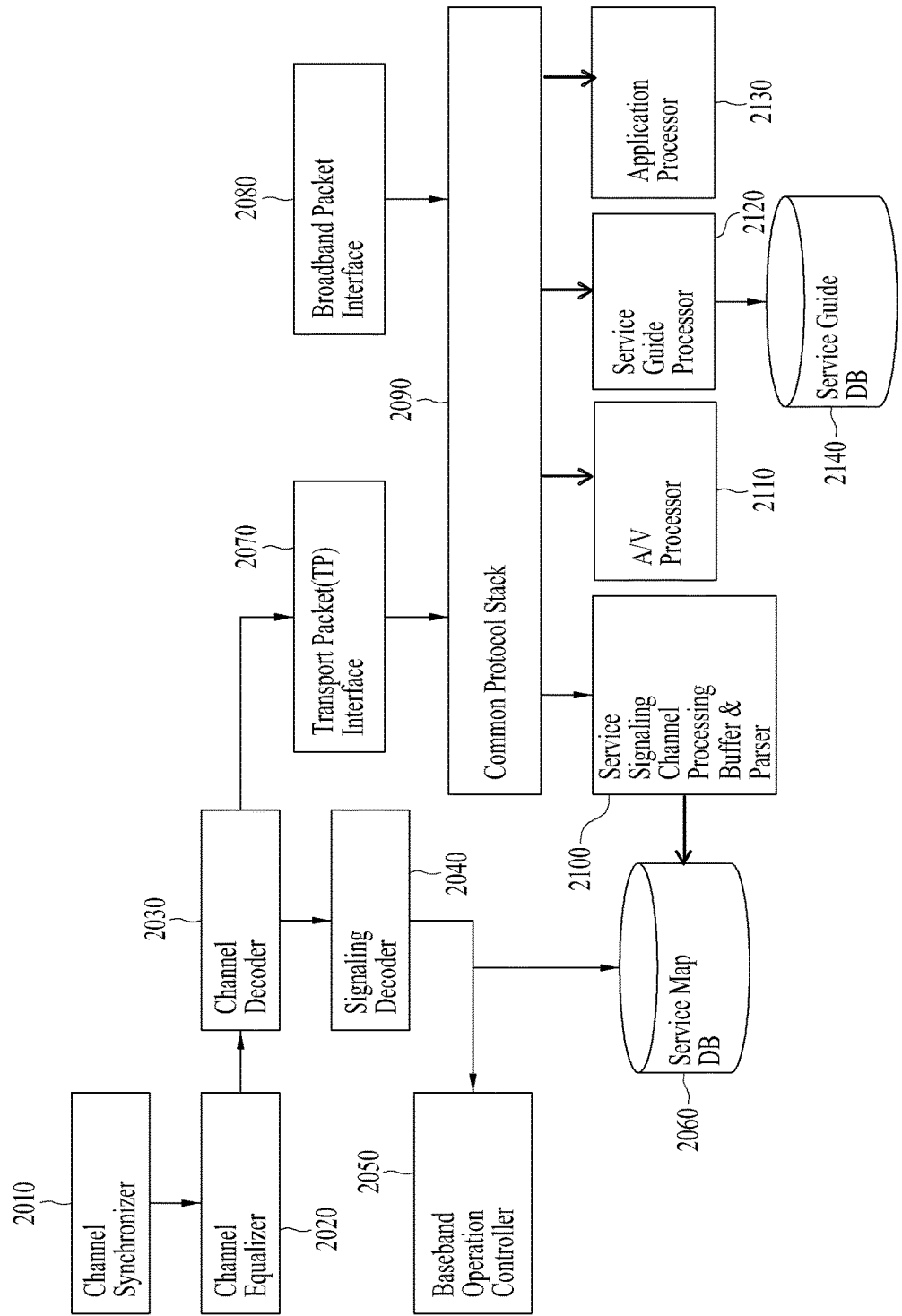
FIG. 2 is a diagram illustrating a receiver of a next generation broadcasting system according to one embodiment of the present invention.

FIG. 2 is a diagram illustrating a receiver of a next generation broadcasting system according to one embodiment of the present invention.

The receiver according to one embodiment of the present invention may include a receiving unit (not shown), a channel synchronizer 2010, a channel equalizer 2020, a channel decoder 2030, a signaling decoder 2040, a baseband operation controller 2050, a service map database (DB) 2060, a transport packet interface 2070, a broadband packet interface 2080, a common protocol stack processor 2090, a service signaling channel processing buffer & parser 2100, an A/V processor 2110, a service guide processor 2120, an application processor 2130, and/or a service guide database (DB) 2140.

The receiving unit (not shown) receives a broadcast signal.

The channel synchronizer 2010 synchronizes symbol frequency with timing to enable decoding of a signal received by a baseband. In this case, the baseband indicates an area where a broadcast signal is transmitted and received.

The channel equalizer 2020 performs channel equalization for the received signal. The channel equalizer 2020 serves to compensate for the received signal when the received signal is distorted due to multipath, Doppler effect, etc.

The channel decoder 2030 recovers the received signal to a significant transport frame. The channel decoder 2030 performs forward error correction (FEC) for data included in the received signal and the transport frame.

The signaling decoder 2040 extracts and decodes signaling data included in the received signal. In this case, signaling data include signaling data and/or service information (SI), which will be described later.

The baseband operation controller 2050 controls signal processing at the baseband.

The service map DB 2060 stores signaling data and/or service information therein. The service map DB 2060 may store signaling data transmitted by being included in the broadcast signal and/or signaling data transmitted by being included in a broadband packet.

The transport packet interface 2070 extracts a transport packet from the transport frame or the broadcast signal. The transport packet interface 2070 extracts signaling data or IP datagram from the transport packet.

The broadband packet interface 2080 receives a broadcasting related packet through the Internet network. The broadband packet interface 2080 extracts the packet acquired through the Internet network and combines or extracts signaling data or A/V data from the corresponding packet.

The common protocol stack processor 2090 processes the received packet in accordance with a protocol included in the protocol stack. For example, the common protocol stack processor 2090 may process the received packet in accordance with the aforementioned protocol stack.

The service signaling channel processing buffer & parser 2100 extracts signaling data included in the received packet. The service signaling channel processing buffer & parser 2100 extracts signaling information related to scan and/or acquisition of service and/or contents from the IP datagram and parses the extracted signaling information. The signaling data may exist in a certain position or channel within the received packet. This position or channel may be referred to as a service signaling channel. For example, the service signaling channel may have a specific IP address, a UDP port number, a transmission session identifier, etc. The receiver may recognize data transmitted to the specific IP address, the UDP port number and the transmission session as signaling data.

The A/V processor 2110 performs decoding and presentation processing for the received audio and video data.

The service guide processor 2120 extracts announcement information from the received signal, manages the service guide DB 2140, and provides a service guide.

The application processor 2130 extracts application data and/or application related information included in the received packet and processes the extracted data and/or information.

The service guide DB 2140 stores service guide data.

Figure 3:
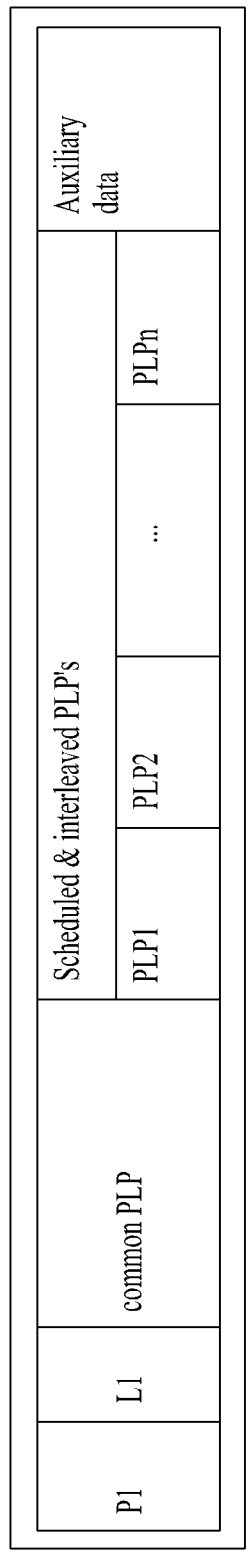
FIG. 3 is a diagram illustrating a transport frame according to one embodiment of the present invention.

FIG. 3 is a diagram illustrating a transport frame according to one embodiment of the present invention.

The transport frame according to one embodiment of the present invention indicates a set of data delivered from the physical layer.

The transport frame according to one embodiment of the present invention may include P1 data, L1 data, a common PLP, PLPn data and/or auxiliary data. In this case, the common PLP may be referred to as a common data unit.

The P1 data correspond to information used to detect a transmitting signal, and includes information for channel tuning. The P1 data may include information required to decode the L1 data. The receiver may decode the L1 data based on a parameter included in the P1 data.

The L1 data includes information for a structure of the PLP and configuration of the transport frame. The receiver may acquire PLPn (n is a natural number) or identify the configuration of the transport frame by using the L1 data, thereby extracting required data.

The common PLP includes service information commonly applied to PLPns. The receiver may acquire information, which should be shared between the PLPs, through the common PLP. The common PLP may not exist depending on the structure of the transport frame. The L1 data may include information that identifies whether the common PLP is included in the transport frame.

The PLPn includes data for contents. A component comprised of audio, video and/or data is transmitted to an interleaved PLP area comprised of PLP1 to PLPn. In this case, information that identifies a PLP to which a component constituting each service (channel) is transmitted may be included in the L1 data or the common PLP.

The auxiliary data may include data for a modulation scheme, a coding scheme and/or a data processing scheme, which is additionally provided in the next generation broadcasting system. For example, the auxiliary data may include information for identifying a data processing scheme which is newly defined. The auxiliary data may be used for extension of the transport frame according to the system which is enlarged later.

In the case that service information on service configuration is signaled through the L1 data, the receiver may immediately recognize service configuration and apply the recognized service configuration thereto when the L1 data is received. However, in this case, there is a drawback in that the amount of service information that may be transmitted through the L1 data is restricted. Therefore, it is preferable that service information required to be applied immediately is signaled to L1.

In the case that service information for service configuration is signaled through a layer (protocol layer) higher than L1 (layer 1, for example, physical layer), service information cannot be acquired and cannot be applied to the receiver until decoding is completely performed for the corresponding layer. Therefore, in this case, there is a drawback in that it is difficult to change corresponding service information or reflect the changed details of the corresponding service information, or it is difficult for the receiver to immediately reflect the corresponding service information. On the other hand, in this case, it is advantageous in that a large capacity of data (including signaling data) can be transmitted. Therefore, it is preferable that a layer higher than L1 transmits general service configuration information.

The advantage and the drawback of the aforementioned two cases can be complemented through a method for using both L1 and a layer higher than L1 for signaling. Information as to that immediate change should be reflected at a PLP level such as high data rate feature and information, such as audio, video and data, for a component of which configuration may be changed for another service at any time by a transmitting side may be delivered from the L1. That is, this information may be transmitted by being included in the L1 data of the transport frame. Meanwhile, information for identifying a component by which each service is configured and/or general information for channel reception may be transmitted and received from and to the layer higher than the L1.

Figure 4:
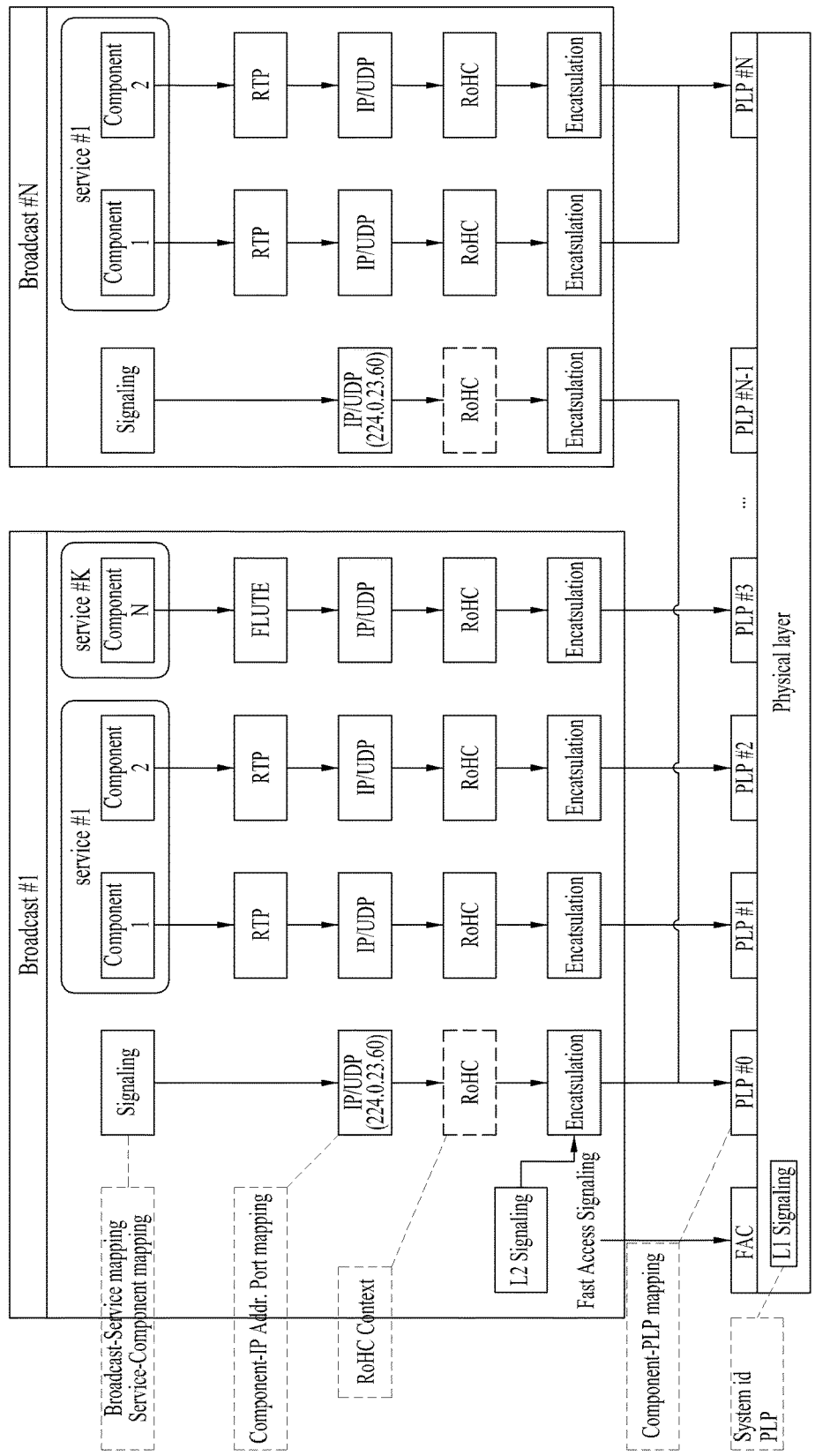
FIG. 4 is a diagram illustrating a delivery system of data in a next generation broadcasting system according to one embodiment of the present invention.

FIG. 4 is a diagram illustrating a delivery system of data in a next generation broadcasting system according to one embodiment of the present invention.

The delivery system through a next generation broadcast network refers to a system that may transmit broadcast service related data through one or more data units (for example, PLP; Physical layer pipe—a series of logical data delivery paths to which the same FEC is applied, hereinafter referred to as PLP) on one or more frequencies. The next generation broadcasting system may encapsulate broadcast service related signaling and broadcasting A/V contents and data related to the broadcast service related signaling through one or more broadcasting stations and transmit them through one delivery system.

One broadcast service at each broadcasting station include a plurality of components, for example, audio, video or data components. In case of real time broadcasting A/V services, each component data can be encapsulated and then transmitted through one or more data units (for example, PLP). Non-real time contents or non-real time data can be encapsulated and then transmitted through one or more data units (for example, PLP). A plurality of PLP data for transmitting component data generated by one or more broadcasting stations may be included in the transport frame substantially transmitted through the broadcast network.

FIG. 5 is a diagram illustrating network information according to one embodiment of the present invention.

In one embodiment of the present invention, broadcasting station related information associated with data included in the transport frame transmitted through the broadcast network can be signaled, whereby the receiver easily performs channel scan, and a user is supported to receive services related to a specific broadcasting station quickly and exactly. This signaling may include broadcasting station information associated with data delivered on a network and delivery system related information on the corresponding network.

Network information according to one embodiment of the present invention may include a network_id element, a num_broadcast element, a broadcast_id element, an original_network_id element, a delivery_system_descriptor_length element and/or a delivery_system_descriptor( ) element.

The network_id element is a unique identifier for identifying a broadcast network which is currently transmitted.

The num_broadcast element indicates the number of broadcast networks included in the network information.

The broadcast_id element is a unique identifier for identifying a broadcasting station on a broadcast network which is transmitted. The broadcast_id element may have a value such as transport_stream_id in case of a broadcasting station that transmits MPEG-2 TS based data.

The original_network_id element is a unique identifier for identifying a broadcast network which is transmitted originally. The original_network_id element includes information for the broadcast network which is transmitted originally when the broadcast network which is transmitted originally is different from the broadcast network which is transmitted currently.

The delivery_system_descriptor_length element indicates a length of the delivery_system_descriptor( ) element.

The delivery_system_descriptor( ) element includes delivery system (delivery_system) related detailed information transmitted on the current broadcast network. The delivery_system_descriptor( ) element may be defined in the form of descriptor.

FIG. 6 is a diagram illustrating a network information table according to one embodiment of the present invention.

According to one embodiment of the present invention, the network information may be defined in the form of table and then transmitted by being included in a broadcast signal. In this case, the network information table may be transmitted by being divided into a plurality of sections. Each of the sections may simply be referred to as a network information table.

The network information table according to one embodiment of the present invention may include a table_id field, a section_syntax_indicator field, a reserved_future_use_field, a section_length field, a network_id field, a version_number field, a current_next_indicator field, a section_number field, a last_section_number field, a network_descriptors_length field, a descriptor( ) element, a transport_stream_loop_length field, a broadcast_id field, an original_network_id field, a delivery_system_descriptor_length field, a delivery_system_descriptor( ) element and/or a CRC_32 field.

The table_id field identifies a table. The table_id field identifies that a current table is the network information table.

The section_syntax_indicator field is information whether a private section follows a general section syntax after the section_length field or separate data.

The reserved_future_use field is a field reserved for later extension although not used currently.

The section_length field indicates a length of the section.

The network_id field is a unique identifier for identifying the broadcast network which is transmitted currently.

The version_number field indicates version information of the corresponding section.

The current_next_indicator field identifies whether the corresponding section is currently applicable.

The section_number field indicates a number of the section. For example, the section_number field identifies a number of each section when the network information table is transmitted to a plurality of sections.

The last_section_number field indicates a number of the last section. For example, the last_section_number field indicates a number of the last section when the network information table is transmitted to a plurality of sections.

The network_descriptors_length field indicates a length of a network descriptor.

The descriptor( ) element includes a descriptor related to the network information table.

The transport_stream_loop_length field indicates a length of a loop that describes a transport steam (TS). In the present invention, when broadcast data is transmitted in another form not the TS, the transport_stream_loop_length field may indicate a length of a loop that describes the corresponding data.

The broadcast_id field is a unique identifier for identifying a broadcasting station on the broadcast network. The broadcast_id field may have a value such as transport_stream_id in case of a broadcasting station that transmit MPEG-2 TS based data.

The original_network_id field is a unique identifier for identifying the broadcast network which is transmitted originally. The original_network_id field includes information for the broadcast network which is transmitted originally when the broadcast network which is transmitted originally is different from the broadcast network which is transmitted currently.

The delivery_system_descriptor_length field indicates a length of a descriptor related to the delivery system.

The delivery_system_descriptor( ) element includes a descriptor that describes the delivery system.

The CRC_32 field indicates a value of CRC that gives 0 as an output value of a register within a decoder.

FIG. 7 is a diagram illustrating a delivery_system_descriptor (delivery_system_descriptor) according to one embodiment of the present invention.

The aforementioned delivery_system_descriptor may have the same type as that of FIG. 7. The delivery_system_descriptor may provide information for PLP that transmits signaling information associated with data transmitted from a specific broadcasting station on the delivery system.

The delivery_system_descriptor (delivery_system_descriptor) according to one embodiment of the present invention may include a descriptor_tag element, a descriptor_length element, a delivery_system_id element, a base_PLP_id element and/or a delivery_system_parameters( ) element.

The descriptor_tag element is information for identifying the delivery system descriptor.

The descriptor_length element indicates a length of the delivery system descriptor.

The delivery_system_id element is information for identifying a unique delivery system of the broadcast network which is transmitted. The delivery_system_id element is information for identifying a delivery system adopted by the broadcast network that transmits a broadcast signal.

The base_PLP_id element is information for identifying a PLP that includes program specific information/service information (PSI/SI) of a specific broadcasting station corresponding to the broadcast_id element (or field). The receiver may acquire signaling information for service, etc. through the PLP indicated by the base_PLP_id element, and may acquire component data constituting the corresponding service by using the acquired signaling information. The base_PLP_id element is information for identifying a data unit that includes corresponding signaling information when the corresponding signaling information is transmitted to the protocol layer above the physical layer. For example, the base_PLP_id element is information for identifying a PLP that includes signaling information. The receiver may first parse the PLP identified by the base_PLP_id element and acquire signaling information associated with broadcast service or broadcast contents by using the information included in the corresponding PLP.

In the present invention, the PLP that includes the aforementioned signaling data may be referred to as a base PLP.

In the ATSC which is the north American broadcasting system, a separate channel is provided to transmit program specific information/program and system information protocol (PSI/PSIP) which is a kind of signaling information. In the DVB-T2 which is the European broadcasting system, all the PLPs included in the transport frame or the broadcast signal are decoded, whereby signaling information is collected. In the DVB-NGH which is the European mobile broadcasting system, signaling information is transmitted by being included in a common PLP, whereby data are restrictively reserved for signaling information. Therefore, in the above systems, it is not required to separately identify a PLP that includes signaling information. However, in the present invention, signaling information can be transmitted through one or more PLPs such that there is no limitation in the amount of data transmission for signaling information, and the base_PLP_id element can be signaled by the receiver to previously identify PLPs that include signaling information. As a result, the receiver can identify and decode a required PLP only without decoding all the PLPs to obtain signaling information.

The delivery_system_parameters( ) element may include parameters indicating broadcast delivery system characteristics such as bandwidth, guard interval, transmission mode and/or center frequency.

Figure 8:
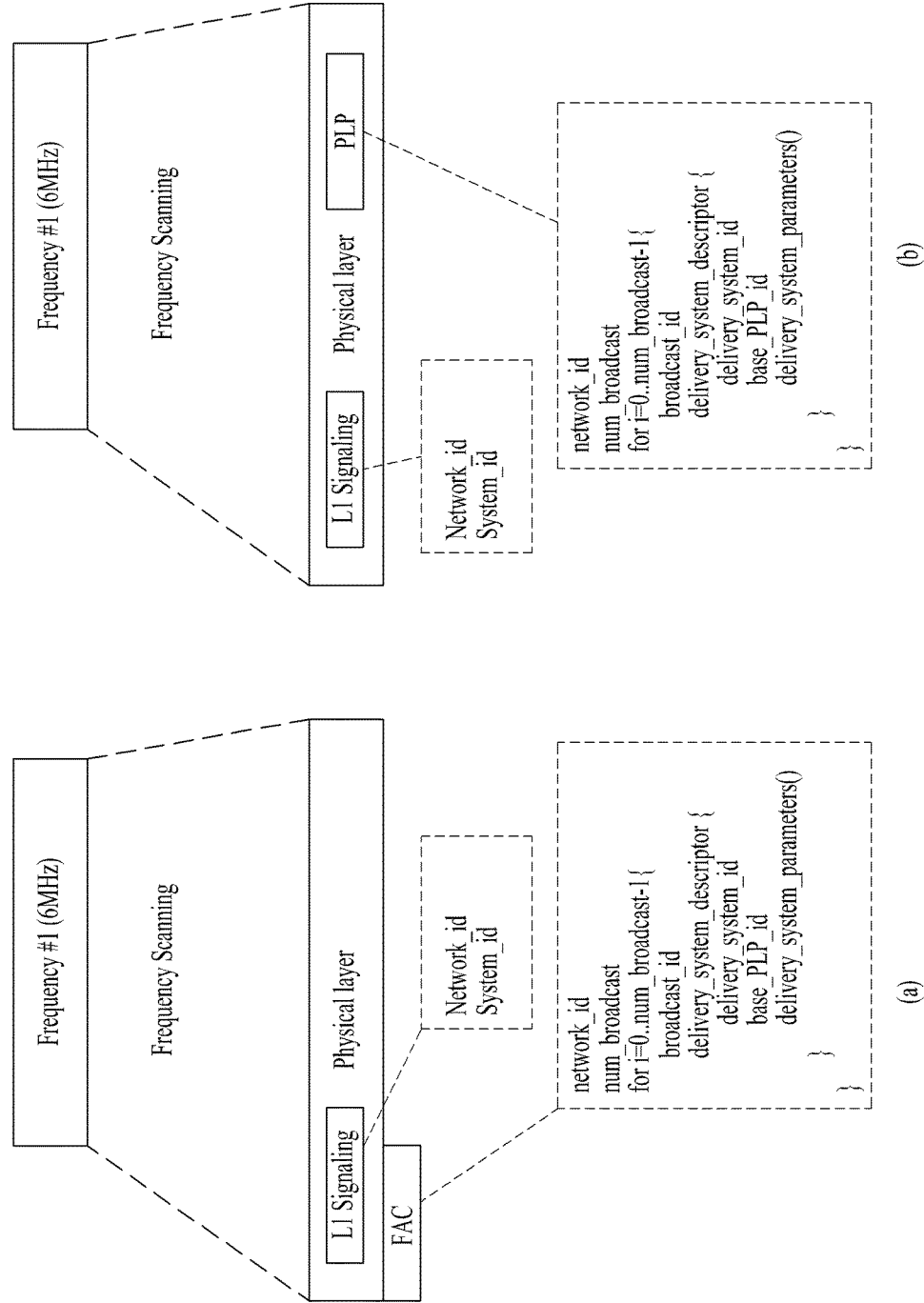
FIG. 8 is a diagram illustrating a method for transmitting network information, which includes a delivery system descriptor, according to one embodiment of the present invention.

FIG. 8 is a diagram illustrating a method for transmitting network information, which includes a delivery system descriptor, according to one embodiment of the present invention.

The network information or network information table, which includes the aforementioned delivery system descriptor, can be transmitted through a fast access channel (FAC), FIC, common PLP and/or PLP.

Referring to (a) of FIG. 8, data of a physical layer within a frequency scan range may include L1 signaling data, broadcast data and/or FAC (or FIC) data. The L1 signaling data may include network_id information for identifying a network and/or system_id information for identifying a broadcasting system. The FAC may include the aforementioned network information, and the corresponding network information may include a delivery system descriptor. The FAC data may be transmitted by being included in a certain part of the data of the physical layer within the frequency scan range. Since the receiver previously knows the corresponding part, the receiver can acquire the FAC data. The receiver may identify and parse the PLP, which transmits signaling data, by parsing network information from the FAC, parsing the delivery system descriptor within the network information and parsing the base_PLP_id element within the delivery system descriptor.

Referring to (b) of FIG. 8, data of a physical layer within a frequency scan range may include L1 signaling data, broadcast data and/or a PLP that includes signaling data. The L1 signaling data may include network_id information for identifying a network and/or system_id information for identifying a broadcasting system. The PLP may include the aforementioned network information, and the corresponding network information may include a delivery system descriptor. The receiver may identify and parse the PLP, which transmits signaling data, by parsing network information from the PLP, parsing the delivery system descriptor within the network information and parsing the base_PLP_id element within the delivery system descriptor. The PLP that transmits signaling data may correspond to the common PLP. In this case, since the receiver knows the part where the common PLP is located within the transport frame, the receiver can parse the common PLP without any information. The PLP that transmits signaling data may correspond to a general PLP, and in this case, the L1 signaling data may include information for identifying the PLP that includes the network information, and the receiver accesses the corresponding PLP by using the information.

In the case that the network information is signaled by the method suggested in the present invention, since the receiver can easily acquire broadcasting station related information related to data transmitted per corresponding frequency, the receiver can easily scan information of the broadcasting station that transmits data per channel.

Figure 9:
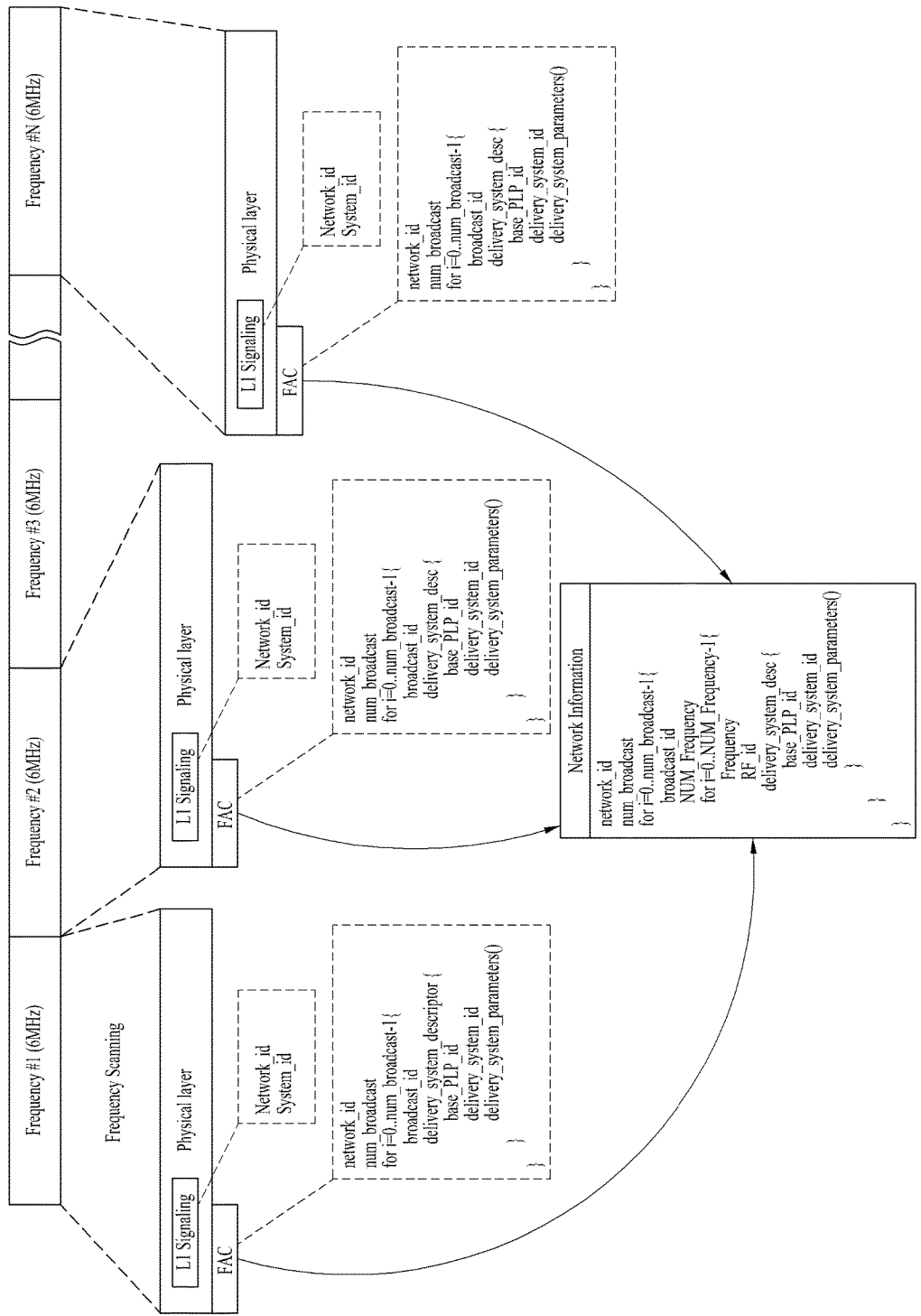
FIG. 9 is a diagram illustrating a service scanning operation of a receiver according to one embodiment of the present invention when network information is transmitted through FAC.

FIG. 9 is a diagram illustrating a service scanning operation of a receiver according to one embodiment of the present invention when network information is transmitted through FAC.

Referring to FIG. 9, in the case that the network information is acquired through the FAC, the receiver can acquire and manage broadcasting station information for all channels by acquiring and collecting broadcasting information within each channel per frequency during channel scan.

The receiver scans a frequency bandwidth allocated to each broadcasting station and acquires FAC included in each frequency bandwidth. The receiver may generate network information for all broadcasting stations by collecting network information from each FAC. The description of each network information will be replaced with the aforementioned description. The procedure of acquiring the FAC by means of the receiver will be replaced with the aforementioned description.

Figures 10, 11:
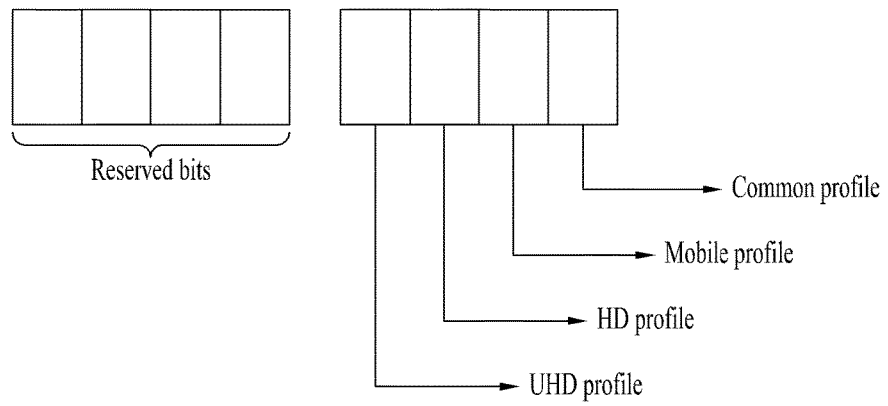
FIG. 10 is a diagram illustrating a delivery descriptor according to one embodiment of the present invention.
FIG. 11 is a diagram illustrating a PLP_profile element according to one embodiment of the present invention.

FIG. 10 is a diagram illustrating a delivery descriptor according to one embodiment of the present invention.

One broadcast service or broadcast content may include a plurality of components. For example, each component may correspond to an audio, video or data component. The receiver should identify and acquire one or more components associated with one broadcast service or broadcast content to provide the corresponding service or content.

According to one embodiment of the present invention, mapping information between the component of the broadcast service and a physical layer pipe (PLP) of the physical layer may be included in signaling data (for example, signaling data included in PSI/PSIP and DVB-SI) related to acquisition of the component of the broadcast service (or broadcast content). Moreover, the mapping information between the component of the broadcast service and the PLP of the physical layer may be transmitted separately. For example, the component-PLP mapping information for each component may be transmitted to a part of the service map table or separate signaling data.

Referring to FIG. 10, the delivery descriptor according to one embodiment of the present invention may include information for connecting the component of the broadcast service (or broadcast content) with the PLP of the physical layer. A PLP_id element indicates a PLP matched with a specific component. For example, the PLP_id element indicates a PLP matched with PID substream of a corresponding stream type in case of an MPEG-2 TS based broadcast service, and indicates a PLP matched with an IP address/port of the corresponding component in case of an IP based broadcast service. The PLP_id element indicates a PLP matched with a packet identifier (id) of the corresponding component in case of a packet based broadcast service.

The delivery descriptor according to one embodiment of the present invention may include a descriptor_tag element, a descriptor_length element, a delivery_system_id element, a PLP_id element and/or a PLP_profile element.

The description of the descriptor_tag element will be replaced with the aforementioned description of the same title.

The description of the descriptor_length element will be replaced with the aforementioned description of the same title.

The delivery_system_id element is a unique delivery system identifier of the broadcast network which is transmitted. The delivery_system_id element is information for identifying a delivery system of the broadcast network that transmits a broadcast signal.

The PLP_id element is an identifier of the PLP transmitted to the physical layer. The PLP_id element is information for identifying a PLP corresponding to a component of a broadcast service (or broadcast content) identified by the PLP_profile element.

The PLP_profile element indicates a profile for which the component transmitted to the PLP identified by the PLP_id element is used. The profile indicated by the PLP_profile element will be described later.

FIG. 11 is a diagram illustrating a PLP_profile element according to one embodiment of the present invention.

The PLP_profile element may be used in the form of a bitwise selector. In one embodiment of the present invention, the PLP_profile element may indicate a common profile, a mobile profile, a high definition (HD) profile, or an ultra high definition (UHD) profile.

If a value of the PLP_profile element is 0x00, the PLP_profile element is a common profile and indicates a component used for all the profiles.

If a value of the PLP_profile element is 0x01, the PLP_profile element is a mobile profile and indicates a component used for mobile broadcasting.

If a value of the PLP_profile element is 0x02, the PLP_profile element is an HD profile and indicates a component used for HD broadcasting.

If a value of the PLP_profile element is 0x03, the PLP_profile element is a UHD profile and indicates a component used for UHD broadcasting.

FIG. 12 is a diagram illustrating a part of a service map table according to one embodiment of the present invention.

FIG. 13 is a diagram illustrating the other part of a service map table according to one embodiment of the present invention.

Although FIGS. 12 and 13 refer to the service map table, service information belonging to the service map table, which will be described later, may be transmitted in the form of data (for example, XML format) not a table format. In this case, the service map table may be referred to as a service map element.

The aforementioned delivery descriptor may be one of a program map table of MPEG-2, which includes information required for service mapping, and a service or content level descriptor of the service map table, among the signaling data for the broadcast service.

The service map table according to one embodiment of the present invention includes a table_id field, a section_syntax_indicator field, a private_indicator field, a section_length field, a table_id extension field, an SMT_protocol_version field, a version_number field, a current_next_indicator field, a section_number field, a last_section_number field, a num_services field, a service_id field, a service_status field, an SP_indicator field, a short_service_name_length field, a short_service_name field, a service_category field, a num_components field, an IP_version_flag field, a service_destination_IP_address_flag field, a service_source_IP_address_flag field, a service_source_IP_address field, a service_destination_IP_address field, a component_source_IP_address_flag field, an essential_component_indicator field, a component_destination_IP_address_flag field, a port_ num_count field, a component_destination_UDP_port_num field, a component_source_IP_address field, a component_destination_IP_address field, a num_component_level_descriptors field, a component_level_descriptor( ) element, a num_service_level_descriptors field and/or a service_level_descriptor( ) element.

The table_id field indicates that a corresponding table includes information related to detailed information of a service and content.

The section_syntax_indicator field is a field indicating a format of a corresponding section, and indicates that the corresponding field follows a general table syntax format when a value of the field is "1" and indicates that the field follows a "short form" format when the value of the field is "0".

The private_indicator field indicates that a corresponding section ends with CRC_32 of 4 bytes when a value of the field is "1".

The section_length field indicates a length of a corresponding section.

The table_id_extension field indicates a field that may include additional information for identifying a corresponding table.

The SMT_protocol_version field indicates a protocol version of SMT which is a corresponding table.

The version_number field indicates a version of a corresponding section.

The current_next_indicator field is a field of 1 bit, and indicates that a table which is transmitted currently is useful when a value of the field is "1" and indicates that the table is not useful currently but is useful later when the value of the field is "0".

The section_number field indicates a section number where a current section is located in the corresponding table.

The last_section_number field indicates a number of the last section that configures the corresponding table.

The num_services field indicates the number of services transmitted through the corresponding table.

The service_id field indicates an identifier that indicates each service, and may have a unique feature within one broadcast range.

The service_status field indicates whether a corresponding service is active or inactive and is hidden or not.

The SP_indicator field indicates whether service protection is applied to a corresponding service.

The short_service_name_length field indicates a length of a service name.

The short_service_name field indicates a name of a service.

The service_category field indicates a category of a service, and its field value will be descried later.

The num_components field indicates the number of components associated with each service.

The IP_version_flag field indicates an IP address format of IP datagram that includes content/service. The IP_version_flag field indicates that IPv4 address format is used when a value of the corresponding field is "0" and Ipv6 address format is used when the value of the corresponding field is "1".

The service_source_IP_address_flag field is a field indicating whether IP datagram that includes content/service includes a source IP address. The service_source_IP_address_flag field indicates that IP datagram includes a source IP address when a value of the corresponding field is 1.

The service_destination_IP_address_flag field is a field indicating whether IP datagram that includes content/service includes a destination IP address. The service_destination_IP_address_flag field indicates that IP datagram includes a destination IP address when a value of the corresponding field is 1.

The service_source_IP_address field indicates a source IP address of IP datagram that includes a content/service.

The service_destination_IP_address field indicates a destination IP address of IP datagram that includes a content/service.

The component_source_IP_address_flag field is information for identifying whether a component_source_IP_address field exists for a current component.

The essential_component_indicator field is information for identifying whether a current component is essential for a current broadcast service or content.

The component_destination_IP_address_flag field is information for identifying whether the component_destination_IP_address field exists for a current component.

The port_num_count field indicates the number of ports of a flow of IP datagram that includes a content/service.

The component_destination_UDP_port_num field indicates a UDP port number of IP datagram that includes a content/service.

The component_source_IP_address field indicates a source address of an IP datagram that transmits a component of a content/service.

The component_destination_IP_address field indicates a destination address of IP datagram that transmits a component of a content/service.

The num_component_level_descriptors field indicates the number of descriptors of a component level for a current component.

The component_level_descriptor( ) element includes a descriptor of a component level. The component_level_descriptor( ) element may include the aforementioned descriptor or a descriptor which will be described later, and in this case, information included in the corresponding descriptor describes each component included in a broadcast service.

The num_service_level_descriptors field indicates the number of descriptors of a service level for a current service.

The service_level_descriptor( ) element includes a descriptor of a service level. The service_level_descriptor( ) element may include the aforementioned descriptor or a descriptor which will be described later, and in this case, information included in the corresponding descriptor describes a broadcast service.

FIG. 14 is a diagram illustrating each field value of a service_category field of a service map table according to one embodiment of the present invention.

If a field value of the service_category field is "0x00", it indicates that a corresponding service is not categorized. If the field value is "0x01", it indicates that the corresponding service is basic TV. If the field value is "0x02", it indicates that the corresponding service is basic radio. If the field value is "0x03", it indicates that the corresponding service is RI (Rights Issuer) service. If the field value is "0x08", it indicates that the corresponding service is service guide. If the field value is "0x09", it indicates that the corresponding service is emergency alerting. If the field value is "0x04~0x07, 0x0A", it indicates that the corresponding service is a service category which is not detailed currently.

If the field value is "0x0B"~"0xFF", it indicates that the corresponding service is a field reserved for future use.

FIG. 15 is a diagram illustrating a procedure of acquiring PLP for transmitting a specific component within a broadcast signal according to one embodiment of the present invention.

The receiver acquires network information through FAC, common PLP and/or PLP as described above, and parses a delivery system descriptor included in the network information. In this case, the delivery system descriptor may be included in signaling data of a higher level of the network information. In this case, the receiver may acquire the delivery system descriptor before acquiring the network information. The receiver parses the base_PLP_id element within the delivery system descriptor.

The receiver acquires a position of the base PLP from L1 signaling data by using the delivery_system_id element included in the delivery system descriptor and the base_PLP_id element, and acquires signaling data from the base PLP. At this time, the receiver may acquire the service map table.

The receiver parses the delivery_system_id element, the PLP_id element and/or the PLP_profile element, which is mapped with respect to each component included in a broadcast service or broadcast content.

The receiver acquires data of a component from the corresponding PLP by using the delivery_system_id element, the PLP_id element and/or the PLP_profile element if data acquisition included in a specific component is required.

Figure 16:
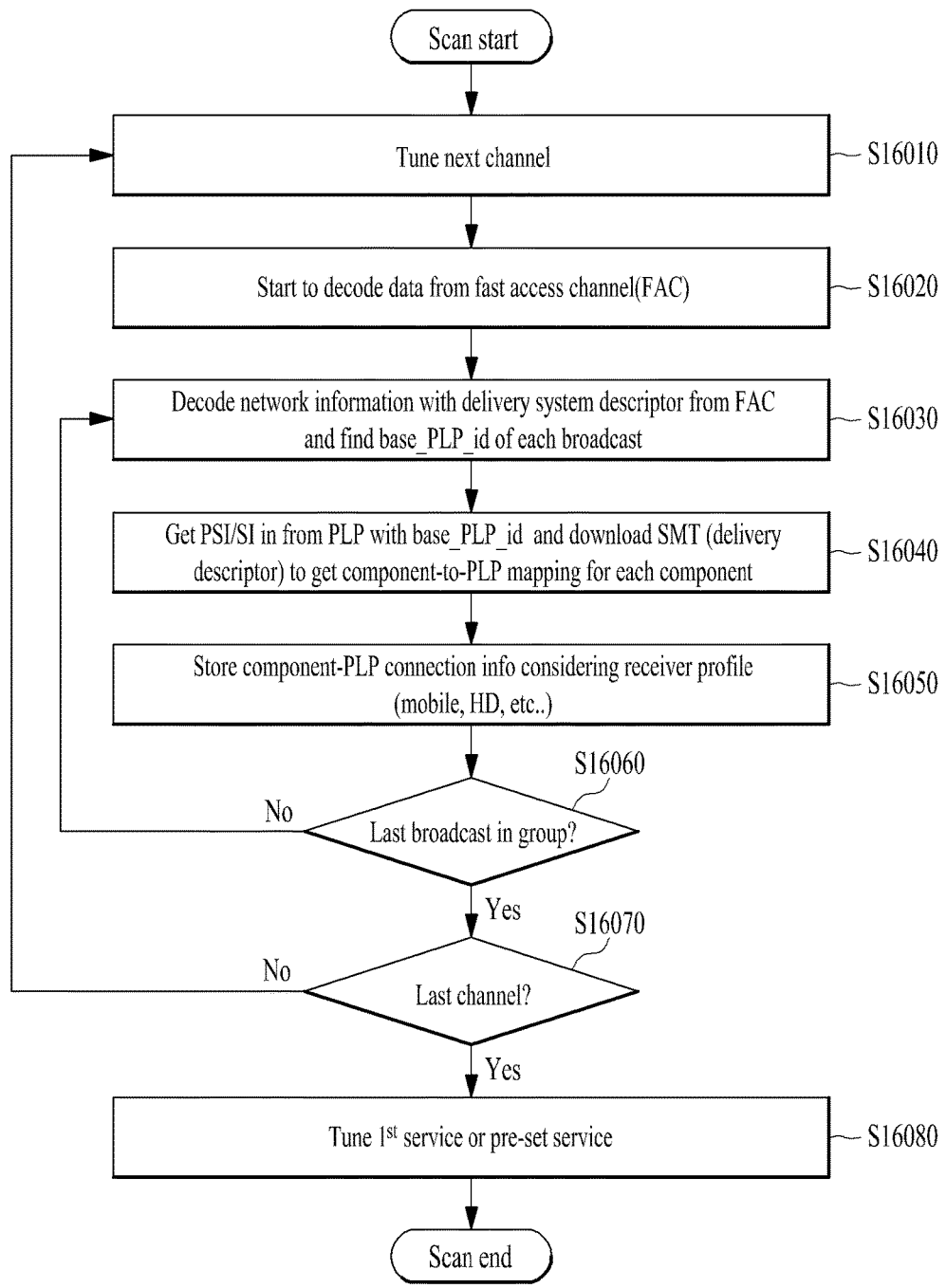
FIG. 16 is a flow chart illustrating a procedure of scanning a service when network information is delivered to FAC in accordance with one embodiment of the present invention.

FIG. 16 is a flow chart illustrating a procedure of scanning a service when network information is delivered to FAC in accordance with one embodiment of the present invention.

According to one embodiment of the present invention, the receiver performs tuning to next channel (s16010).

The receiver decodes data from the FAC (s16020).

The receiver decodes the delivery system descriptor together with network information from the FAC, and acquires the base_PLP_id element of each broadcast service (or broadcasting station) (s16030).

The receiver discovers the base PLP indicated by the base_PLP_id element and acquires signaling data (for example, PSI/SI) from the corresponding base PLP. The receiver acquires the service map table from the signaling data and downloads or parses the delivery descriptor within the service map table for component-PLP mapping for each component (s16040).

The receiver stores association information between the component and the PLP by considering its profile (for example, mobile profile, HD profile, UHD profile, etc.) (s16050).

The receiver identifies whether a corresponding service or broadcasting station corresponds to the last broadcast service (or last broadcasting station) within a broadcast signal (s16060). If another broadcast service (or another broadcasting station) exists within the broadcast signal, the receiver repeats the aforementioned steps s16010 to s16030 for the corresponding broadcast service (or broadcasting station).

If another broadcast service (or another broadcasting station) does not exist within the broadcast signal, the receiver identifies whether a channel scanned by the corresponding broadcast service (or broadcasting station) through the above steps is the last channel (s16070). If another channel exists in the corresponding broadcast service (or broadcasting station), the receiver repeats the aforementioned step s16010.

The receiver tunes to a first service or a preset service (s16080).

Figure 17:
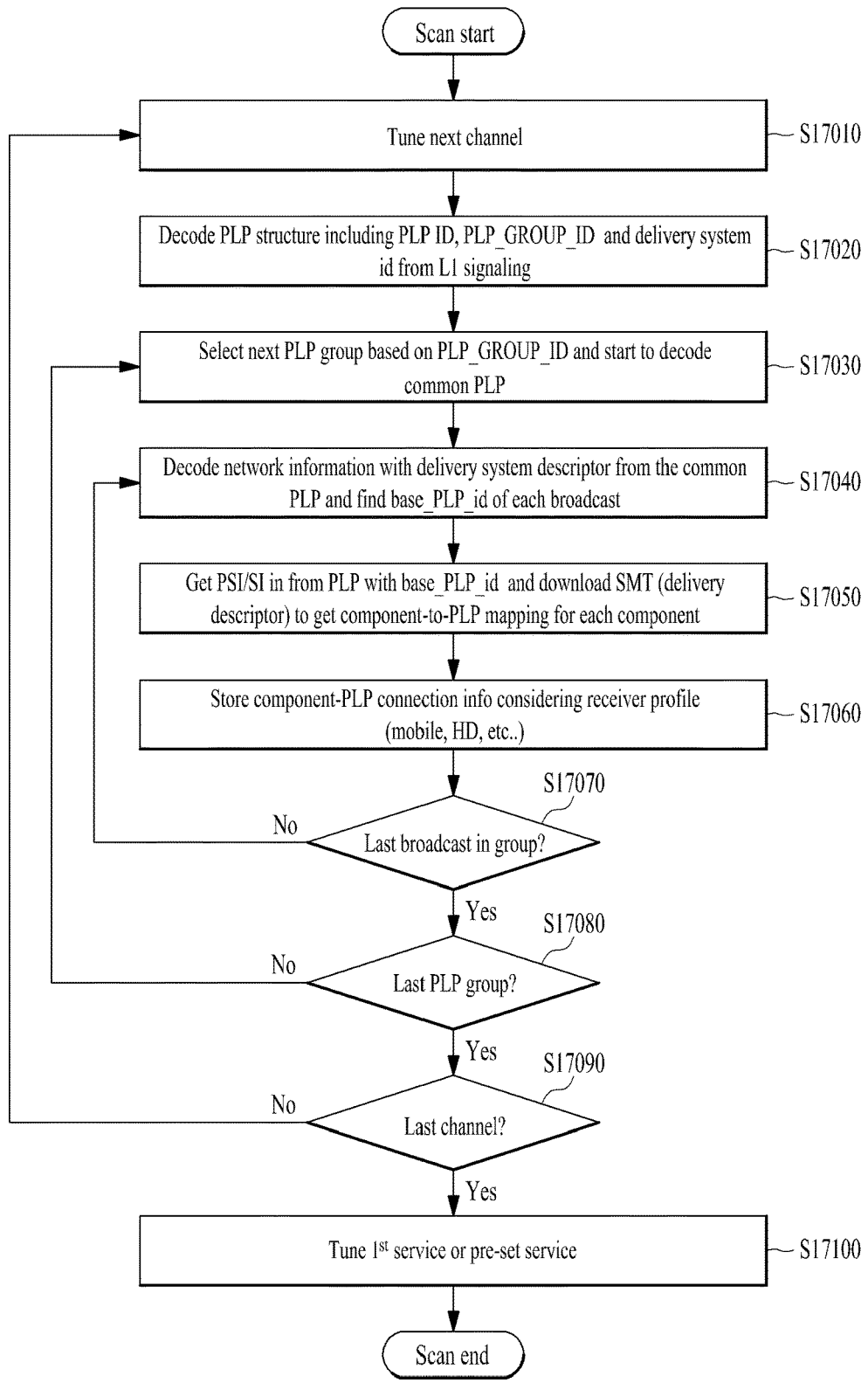
FIG. 17 is a flow chart illustrating a procedure of scanning a service when network information is delivered to a common PLP or a specific PLP in accordance with one embodiment of the present invention.

FIG. 17 is a flow chart illustrating a procedure of scanning a service when network information is delivered to a common PLP or a specific PLP in accordance with one embodiment of the present invention.

According to one embodiment of the present invention, the receiver performs tuning to next channel (s17010).

The receiver decodes a PLP structure, which includes delivery_system_id, PLP_ID and/or PLP_GROUP_ID, from L1 signaling data (s17020). The L1 signaling data may include delivery_system_id, PLP_ID and/or PLP_GROUP_ID. The delivery_system_id is information for identifying a PLP. The PLP_GROUP_ID is information for identifying a PLP group.

The receiver selects next PLP group on the basis of the PLP_GROUP_ID and starts to decode the common PLP (s17030).

The receiver decodes the delivery system descriptor together with the network information from the common PLP and discovers a base PLP of each broadcast service (or broadcasting station) (s17040).

The receiver discovers a base PLP indicated by the base_PLP_id element and acquires the signaling data (for example, PSI/SI) from the corresponding base PLP. The receiver acquires the service map table from the signaling data and downloads or parses the delivery descriptor within the service map table for component-PLP mapping for each component (s17050).

The receiver stores association information between the component and the PLP by considering its profile (for example, mobile profile, HD profile, UHD profile, etc.) (s17060).

The receiver identifies whether a corresponding broadcast service or broadcasting station corresponds to the last broadcast service (or last broadcasting station) within a broadcast signal (s17070). If another broadcast service (or another broadcasting station) exists within the broadcast signal, the receiver repeats the aforementioned steps s17010 to s17040 for the corresponding broadcast service (or broadcasting station).

The receiver identifies whether a corresponding PLP group corresponds to the last PLP group of the corresponding broadcast service or broadcasting station (s17080). If another PLP group exists within the broadcast service (or broadcasting station), the receiver repeats the aforementioned steps s17010 to s17030 for the another PLP group.

The receiver identifies whether a corresponding channel corresponds to the last channel of the corresponding PLP group (s17090). If another channel exists in the corresponding PLP group, the receiver repeats the aforementioned step s17010 for the another channel.

Figure 18:
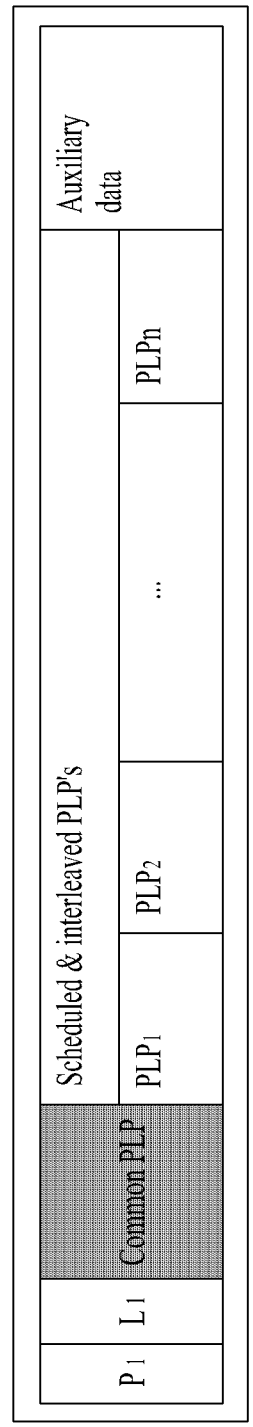
FIG. 18 is a diagram illustrating a transport frame according to another embodiment of the present invention.

FIG. 18 is a diagram illustrating a transport frame according to another embodiment of the present invention.

The transport frame according to another embodiment of the present invention indicates a set of data delivered from the physical layer.

The transport frame according to another embodiment of the present invention may include P1 data, L1 data, a common PLP, PLPn data and/or auxiliary data.

The P1 data correspond to information used to detect a transmitting signal, and includes information for channel tuning. The P1 data may include information required to decode the L1 data. The receiver may decode the L1 data based on a parameter included in the P1 data.

The L1 data includes information for a structure of the PLP and configuration of the transport frame. The receiver may acquire PLPn (n is a natural number) or identify the configuration of the transport frame by using the L1 data, thereby extracting required data.

The common PLP includes service information commonly applied to PLPns. The receiver may acquire information, which should be shared between the PLPs, through the common PLP. The common PLP may not exist depending on the structure of the transport frame. The L1 data may include information that identifies whether the common PLP is included in the transport frame.

The PLPn includes data for contents. A component comprised of audio, video and/or data is transmitted to an interleaved PLP area comprised of PLP1 to PLPn. In this case, information that identifies a PLP to which a component constituting each service (channel) is transmitted should be signaled.

The auxiliary data may include data for a modulation scheme, a coding scheme and/or a data processing scheme, which is additionally provided in the next generation broadcasting system. For example, the auxiliary data may include information for identifying a data processing scheme which is newly defined. The auxiliary data may be used for extension of the transport frame according to the system which is enlarged later.

FIG. 19 is a diagram illustrating component-PLP mapping information according to one embodiment of the present invention.

As described above, the information that identifies a PLP to which a component constituting each service (channel) is transmitted should be signaled. To this end, component-PLP mapping information as shown in FIG. 19 may be signaled through a common PLP, a specific PLP and/or FAC.

A PLP id element, a delivery_system_id element, and a PLP profile element may be included in the component-PLP mapping information as PLP related information. Encapsulation system information and encapsulation parameter related information may be included in the component-PLP mapping information as component related information.

The component-PLP mapping information may include a num_PLP element, a delivery_system_id element, a PLP_id element, a PLP_profile element, a num component element, an identifier_type element and/or a component_parameters (identifier_type) element.

The num_PLP element indicates the number of PLPs transmitted from the transport frame.

The delivery_system_id element is a unique identifier of a broadcast network which is transmitted. More detailed description of the delivery_system_id element will be replaced with the description of the aforementioned element of the same title.

The PLP_id element is an identifier of the PLP transmitted to the physical layer. More detailed description of the PLP_id element will be replaced with the description of the aforementioned element of the same title.

The PLP_profile element indicates a profile for which a component transmitted to the PLP is used. More detailed description of the PLP_profile element will be replaced with the description of the aforementioned element of the same title.

The num_component element indicates the number of components transmitted through the corresponding PLP.

The identifier_type element indicates a format for identifying the corresponding component in accordance with an encapsulated scheme of the corresponding component. For example, if a value of the identifier_type element is 00, it may indicate PID of MPEG-2 TS, if the value of the identifier_type element is 01, it may indicate IP address and port number, and if the value of the identifier_type element is 02, it may indicate a series of IDs.

The component_parameters (identifier_type) element or the component_parameters element includes a component related parameter according to an identifying scheme (for example, scheme based on information indicated by identifier_type element) of a component.

FIG. 20 is a diagram illustrating a component_parameters element according to one embodiment of the present invention when a value of an identifier_type element indicates that a component is encapsulated by MPEG-2 TS.

For example, if the value of the identifier_type element is 00, it may indicate that each component is encapsulated by MPEG-2 TS, and each component may be identified using a pid (packet identifier) value. Therefore, the component_parameters may have a syntax as shown in FIG. 20.

If the value of the identifier_type element indicates that the component is encapsulated by MPEG-2 TS, the component_parameters element includes a pid element.

The pid element may indicate a PID (packet identifier) value of MPEG-2 transport stream that includes a service/content.

FIG. 21 is a diagram illustrating a component_parameters element according to one embodiment of the present invention when a value of an identifier_type element indicates that a component is identified by IP address and port number.

For example, if the value of the identifier_type element is 01, each component of a broadcast service or broadcast content may be identified using IP address and port number. In this case, the component_parameters element may have syntax as shown in FIG. 21.

If the value of the identifier_type element indicates that each component is identified using IP address and port number, the component_parameters element may include a header compression type element, a context_profile element, a context_id element, a static_chain length element, a static_chain byte element, an IP_version_flag element, a num_IP element, an IP_address element and/or a port_num element.

The header_compression_type element indicates a compression scheme of an IP header. For example, if a value of the header_compression_type element is '0', it may indicate that compression has not been used (No compression). If the value of the header_compression_type element is '1', it may indicate that RoHC (Robust Header Compression) has been used.

The context_profile element indicates a corresponding protocol during IP header compression. For example, the context_profile element may be matched with RFC 3095. If the value of the context_profile element is '0', it may indicate that compression has not been used or ROHC has been used. If the value of the context_profile element is '1', it may indicate that corresponding compression has not been to reach RTP. If the value of the context_profile element is '2', it may indicate that corresponding compression has been used to reach UDP. If the value of the context_profile element is '3', it may indicate that corresponding compression has been used to reach ESP. If the value of the context_profile element is '4', it may indicate that corresponding compression has been used to reach IP. If the value of the context_profile element is '5', although not defined, it may be defined to indicate that corresponding compression has been used to reach another protocol.

The context_id element indicates context_id compressed by IP header.

The static_chain_length element indicates a length of the static_chain_byte element.

The static_chain_byte element indicates information configured by a static field during header compression.

The IP_version_flag element indicates IP address format of IP datagram. For example, if a value of the IP_version_flag element is '0', it may indicate that Ipv4 format is used. If the value of the IP_version_flag element is '1', it may indicate that Ipv6 address format is used.

The num_IP element indicates the number of IP datagrams that transmit component.

The IP_address element indicates IP address of IP datagram.

The port_num element indicates a port number of IP datagram.

FIG. 22 is a diagram illustrating a component_parameters element according to one embodiment of the present invention when a value of an identifier_type element indicates that a component is identified using an ID value.

For example, if a value of the identifier_type element is 02, each component may be identified using a series of ID values. Therefore, the component_parameters element may have syntax as shown in FIG. 22.

In this case, the component_parameters element includes an id element.

The id element indicates an ID value (ID value of transport packet) indicating a component.

Figure 23:
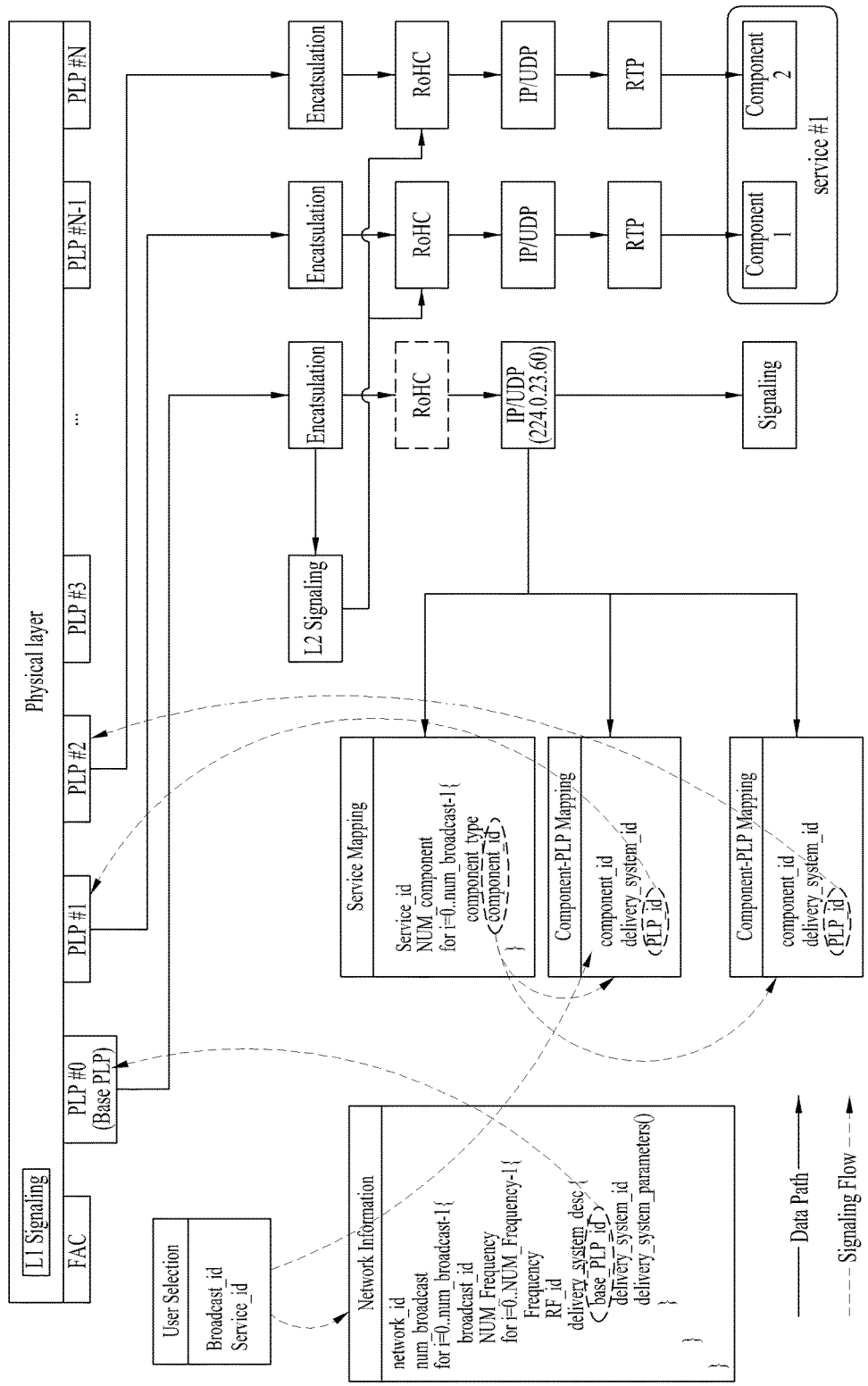
FIG. 23 is a diagram illustrating a procedure of acquiring a component of a broadcast service or broadcast content in accordance with one embodiment of the present invention.

FIG. 23 is a diagram illustrating a procedure of acquiring a component of a broadcast service or broadcast content in accordance with one embodiment of the present invention.

If a user selects a specific broadcast service (or broadcasting station), the receiver acquires network information. A method for acquiring network information will be replaced with any one or more of the aforementioned methods. The receiver identifies a base PLP, which includes signaling data, by using information of a base_PLP_id element within the network information.

L2 signaling data may be acquired through the base PLP. That is, the base PLP may include information on a position of L2 signaling data, and the receiver may acquire the L2 signaling data by using the information on the position. Alternatively, the L2 signaling data may be included in the base PLP. The L2 signaling data may include information required to decode the PLP. For example, information for identifying a compression scheme applied to the PLP may be included in the L2 signaling data.

The signaling data included in the base PLP may include a service map table. Alternatively, the base PLP may include information on a specific address for transmitting signaling data, and the receiver may acquire signaling data from the corresponding address. The receiver may identify a component included in a specific broadcast service by using information included in the service map table. The description of the information included in the service map table will be replaced with the aforementioned description.

The receiver acquires component_PLP mapping information. The detailed description of the component-PLP mapping information will be replaced with the aforementioned description. The receiver decodes data transmitted to the corresponding PLP by discovering a PLP, which transmits a component included in the corresponding broadcast service, by using the component-mapping information, and configures a broadcast service by acquiring the corresponding component.

Figure 24:
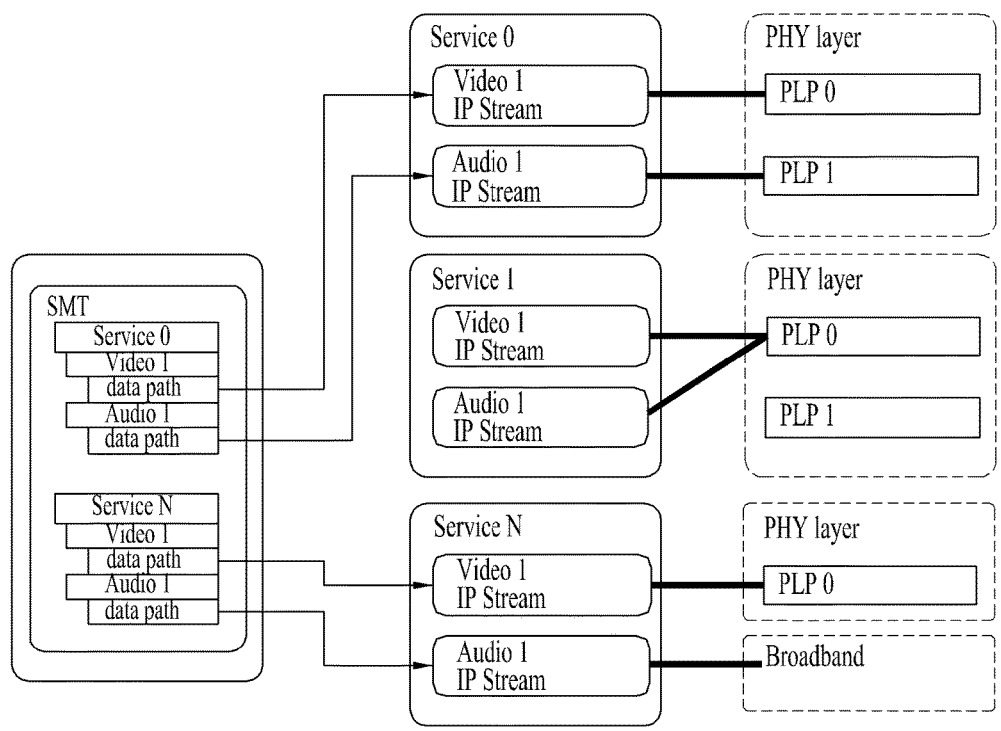
FIG. 24 is a diagram illustrating a structure for acquiring service and/or contents in a next generation broadcasting system in accordance with one embodiment of the present invention.

FIG. 24 is a diagram illustrating a structure for acquiring service and/or contents in a next generation broadcasting system in accordance with one embodiment of the present invention.

According to the method suggested in the present invention, the next generation broadcasting system allows the receiver to efficiently acquire service or contents through a broadcast network or Internet network.

FIG. 24 illustrates an example for acquisition of service or content in a hybrid broadcasting system.

For example, service 0 includes one video and one audio, each of which may be acquired through IP stream transmitted through a terrestrial broadcast network.

In case of service 1, since IP stream for transmitting a video and IP stream for transmitting a video are transmitted through one PLP, the receiver may acquire service 1 by decoding the corresponding PLP.

In case of service N, video is transmitted through a terrestrial broadcast network but audio should be acquired through Internet network, whereby the video and the audio can be provided effectively on the receiver.

As described above, the aforementioned embodiments of the present invention can be used in the procedure of acquiring a component included in service 0, service 1, or service N through the receiver. That is, the receiver can decode corresponding PLPs and desired service by identifying PLP for transmitting each component included in service 0, service 1 or service N.

According to the present invention, the large capacity of signaling data can be transmitted by being included in the broadcast signal.

According to the present invention, the area within the broadcast signal, in which the large capacity of signaling data are included, can be discovered easily.

According to the present invention, among the data units (for example, PLP) included in the broadcast signal, the data unit for transmitting a component included in a specific service or content can be identified and data transmitted by the corresponding data unit can be acquired.

For convenience of description, although the description has been made for each of the drawings, the embodiments of the respective drawings may be incorporated to achieve a new embodiment. A computer readable recording medium where a program for implementing the aforementioned embodiments is recorded may be designed in accordance with the need of the person skilled in the art within the scope of the present specification.

The apparatus and method according to the present invention are not limited to the aforementioned embodiments, and all or some of the aforementioned embodiments may selectively be configured in combination so that various modifications may be made in the aforementioned embodiments.

Meanwhile, the present invention may be implemented in a recording medium, which may be read by a processor provided in a network device, as a code that can be read by the processor. The recording medium that can be read by the processor includes all kinds of recording media in which data that can be read by the processor are stored. Examples of the recording medium include a ROM, a RAM, a magnetic tape, a floppy disk, and an optical data memory. Also, another example of the recording medium may be implemented in a shape of carrier wave such as transmission through Internet. Also, the recording medium that can be read by the processor may be distributed in a computer system connected thereto through the network, whereby codes that can be read by the processor may be stored and implemented in a distributive mode.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

In this specification, both the product invention and the method invention have been described, and description of both inventions may be made complementally if necessary.

Mode for Implementing the Invention

The mode for implementing the present invention has been described as the best mode for implementing the invention.

INDUSTRIAL APPLICABILITY

The present invention can be used for overall broadcasting industry.

The invention claimed is:

1. A receiver for processing a broadcast signal in a hybrid broadcasting system combining a broadcast network and a broadband network, the receiver comprising:
   a receiving unit configured to receive a broadcast signal, wherein the broadcast signal includes physical layer pipe (PLP) data,
   wherein the PLP data includes service data for broadcast services and service signaling data for the service data,
   wherein a first PLP data carried in a specific PLP includes mapping information between each of PLPs and data sets including Internet protocol (IP) packets,
   wherein the first PLP data further includes information on a context identifier for compressed IP packets when IP header compression is applied to the IP packets,
   wherein the first PLP data further includes a scanning table which supports a rapid channel scan and provides required information for a receiving device to build a list of all broadcast services, and
   wherein the scanning table includes information for finding the service signaling data;
   a signaling decoder configured to parse the first PLP data included in the received broadcast signal and acquire the service signaling data,
   wherein the service signaling data includes a service identifier identifying a broadcast service and service status information specifying a status of the broadcast service as being active or inactive; and
   an audio/video processor configured to decode the service data using the service signaling data.

2. The receiver according to claim 1, wherein the PLPs, except for the specific PLP, carry the service data including a video component.

3. The receiver according to claim 1, wherein the first PLP data further includes context profile information indicating a range of a protocol used to compress the IP packets, static information indicating information on a static chain used to compress the IP packets and static length information indicating a length of the static information.

4. The receiver according to claim 1, wherein the service signaling data further includes delivery information on a transport session in which components of the broadcast service are carried.

5. A method for transmitting a broadcast signal of a hybrid broadcasting system combining a broadcast network and a broadband network, the method comprising:
   generating service data for broadcast services;
   generating service signaling data for the service data,
   wherein the service signaling data includes a service identifier identifying a broadcast service and service status information specifying a status of the broadcast service as being active or inactive;
   formatting input data that includes the service data and the service signaling data into physical layer pipe (PLP) data,
   wherein a first PLP data carried in a specific PLP includes mapping information between each of PLPs and data sets including Internet protocol (IP) packets,
   wherein the first PLP data further includes information on a context identifier for compressed IP packets when IP header compression is applied to the IP packets,
   wherein the first PLP data further includes a scanning table which supports a rapid channel scan and provides required information for a receiving device to build a list of all broadcast services, and
   wherein the scanning table includes information for finding the service signaling data;
   generating a broadcast signal that includes the PLP data; and
   transmitting the generated broadcast signal.

6. The method according to claim 5, wherein the PLPs, except for the specific PLP, carry the service data including a video component.

7. The method according to claim 5, wherein the first PLP data further includes context profile information indicating a range of a protocol used to compress the IP packets, static information indicating information on a static chain used to compress the IP packets and static length information indicating a length of the static information.

8. The method according to claim 5, wherein the service signaling data further includes delivery information on a transport session in which components of the broadcast service are carried.

9. The method according to claim 6, wherein the delivery information includes a source IP address, a destination IP address and a destination port number for the transport session.

10. The receiver according to claim 4, wherein the delivery information includes a source IP address, a destination IP address and a destination port number for the transport session.

* * * * *